United States Patent [19]

Anderson

[11] Patent Number: 5,903,309

[45] Date of Patent: May 11, 1999

[54] METHOD AND SYSTEM FOR DISPLAYING IMAGES AND ASSOCIATED MULTIMEDIA TYPES IN THE INTERFACE OF A DIGITAL CAMERA

[75] Inventor: Eric C. Anderson, San Jose, Calif.

[73] Assignee: Flashpoint Technology, Inc., San Jose, Calif.

[21] Appl. No.: 08/716,018

[22] Filed: Sep. 19, 1996

[51] Int. Cl.⁶ .............................. H04N 5/222; H04N 5/76
[52] U.S. Cl. ........................ 348/333; 348/232; 345/348
[58] Field of Search .................................. 348/333, 334, 348/231, 232, 233, 552; 345/326, 115, 116, 119, 327, 348; 386/117; 358/906, 909.1; H04N 5/76, 5/222

[56] References Cited

U.S. PATENT DOCUMENTS

| | | | |
|---|---|---|---|
| 4,827,347 | 5/1989 | Bell | 348/333 |
| 5,124,814 | 6/1992 | Takahashi et al. | 358/906 |
| 5,161,025 | 11/1992 | Nakao | 348/333 |
| 5,164,831 | 11/1992 | Kuchta et al. | 348/233 |
| 5,528,293 | 6/1996 | Watanabe | 348/231 |
| 5,633,678 | 5/1997 | Parulski et al. | 348/232 |
| 5,706,097 | 1/1998 | Schelling et al. | 358/296 |
| 5,742,339 | 4/1998 | Wakui | 348/233 |

*Primary Examiner*—Wendy Garber
*Assistant Examiner*—Ngoc-yen Vu
*Attorney, Agent, or Firm*—Stephen G. Sullivan

[57] ABSTRACT

A method and system for displaying a series of images captured by a digital camera, which includes a user interface that includes a view finder. The method and system first stores each of the captured images in memory, and then displays a plurality of image cells in the view finder, wherein each of the image cells corresponds to one of the captured images. The method and system further provides at least one of the image cells with an image area for displaying the corresponding captured image, and further provides the at least one image cell with an icon area for displaying additional information regarding the corresponding captured image.

13 Claims, 8 Drawing Sheets

| Icon | Icon Key |
|---|---|
| ▭ | Single Image |
| 🗇 | Time Lapse or Burst |
| 🎞 | Movie Clip |
| ▦ | Panorama |
| 🔊 | Sound Attached |

METHOD AND SYSTEM FOR DISPLAYING IMAGES AND ASSOCIATED MULTIMEDIA TYPES IN THE INTERFACE OF A DIGITAL CAMERA

FIELD OF THE INVENTION

The present invention relates generally to digital cameras, and more particularly to a method and system for displaying images in the interface of a digital camera.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

Due to architectural limitations of conventional digital cameras, there are several drawbacks in the user interface that restrict how captured images are displayed and manipulated by a user. The user interface in conventional digital cameras typically includes a view finder for displaying a series of image cells. Each image cell, in turn, displays a small version of a corresponding captured image. Displaying several cells in this manner allows a user to review several images at once. When the user selects one of the cells in the view finder, the full-sized version of the image is then displayed in the view finder.

One problem with conventional digital cameras is that the file format for storing captured images does not directly support the display of image cells. For example, most traditional digital cameras store compressed images in a particular file format in memory. The file typically includes both a header that optionally stores the date and time that the image was taken, and the captured image data itself. The captured image is usually stored in the file as a Joint Photographic Expert Group (JPEG) data.

When a conventional digital camera is to display a series of image cells in the view finder, the digital camera must first retrieve the JPEG data from the appropriate files, decompress the data, and then process the uncompressed images by resizing the images to the size of the image cells. One drawback to this approach is that the decompressing and resizing operations reduce the speed at which the camera can display the full-sized images in the view finder.

Another drawback is that the file format for storing captured images does not support the storage of additional information regarding each image that may be of use to the user. Thus, a conventional digital camera that has stored many pictures can only offer the date and time that each image was captured to distinguish the images for the user.

Accordingly, what is needed is an improved system and method for displaying captured images in a digital camera. The present invention addresses such a need.

SUMMARY OF THE INVENTION

The present invention provides method and system for displaying a series of images captured by a digital camera that includes a user interface which includes a view finder. The method and system first store each of the captured images in memory, and then displays a plurality of image cells in the view finder, wherein each of the image cells corresponds to one of the captured images. The method and system further provide at least one of the image cells with an image area for displaying the corresponding captured image, and further provide the at least one image cell with an icon area for displaying additional information regarding the corresponding captured image.

According to the system and method disclosed herein, a file format is provided that supports the direct display of image cells in the view finder. In addition, graphical icons are displayed in the image cell regarding the media types associated with the image, thereby increasing the ease of use and operation of the digital camera.

DESCRIPTION OF THE INVENTION

The present invention relates to an improvement in displaying images in a digital camera. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a digital camera that includes a method and system for displaying captured images in a digital camera. According to the present invention, a method and system is provided for supporting the direct display of image cells in the view finder, and for extending the image cell of each image in order to provide additional information regarding the image.

Figure 1:
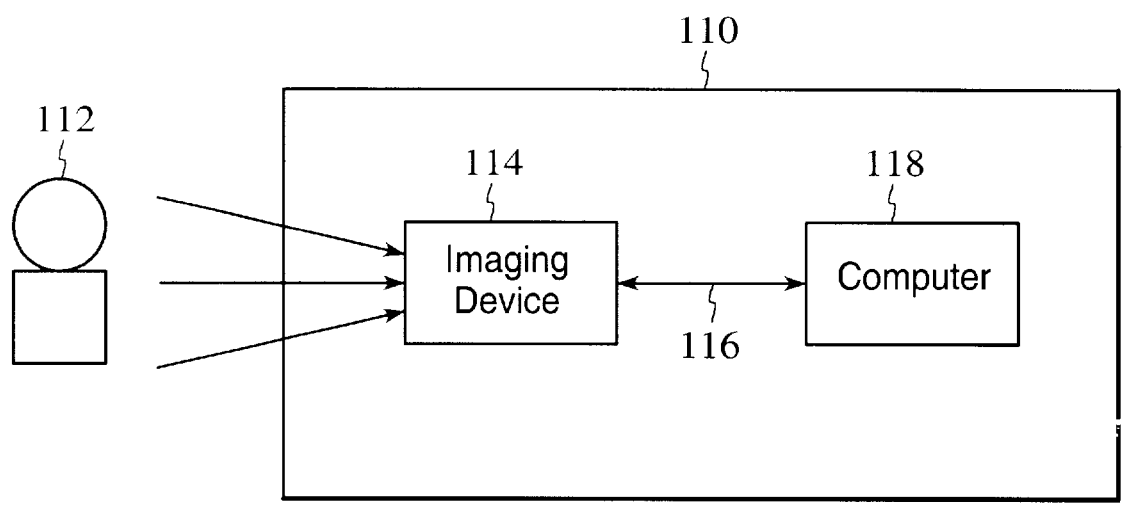
FIG. 1 is a block diagram of a digital camera that operates in accordance with the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
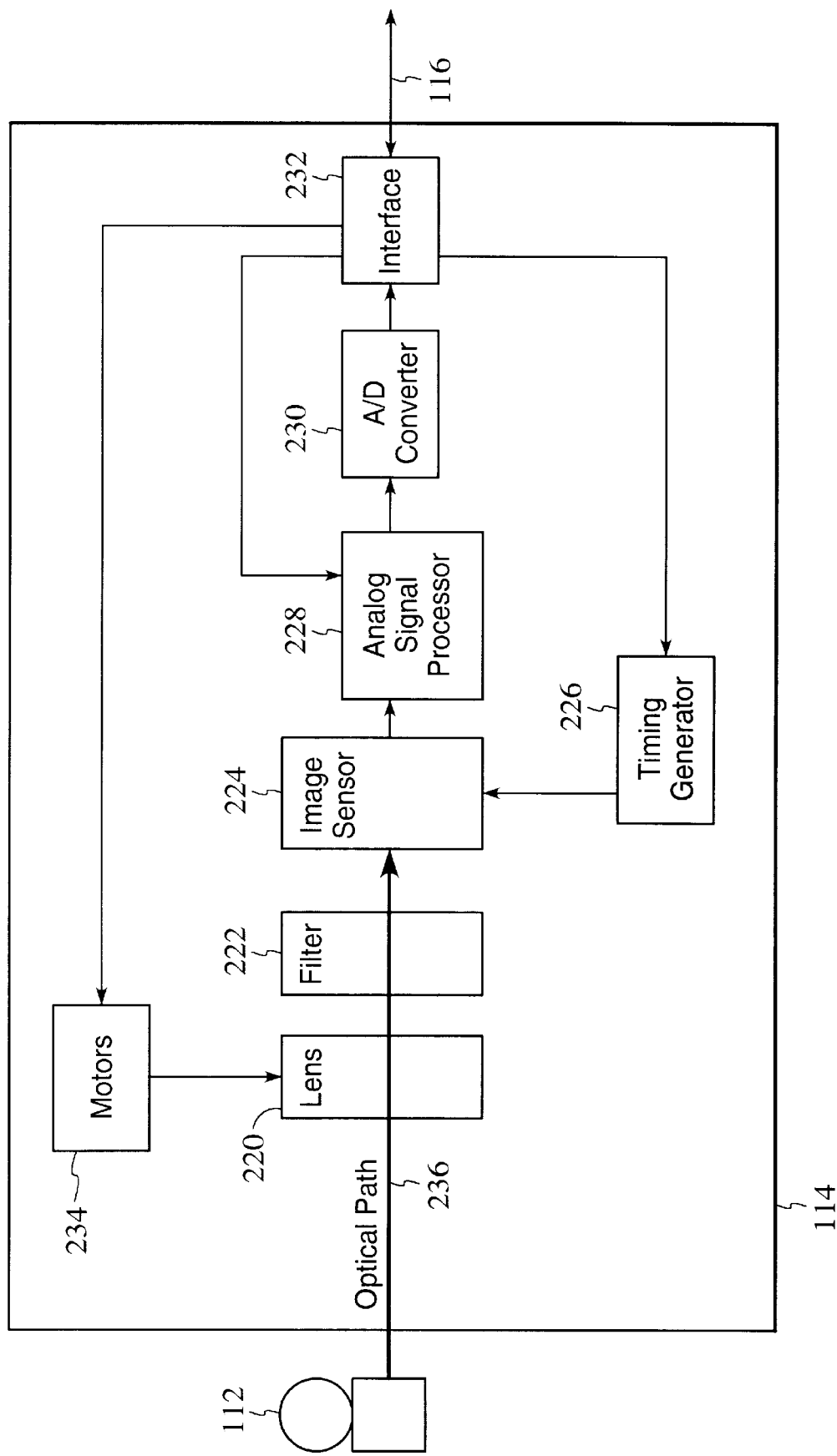
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motor 234.

In operation, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
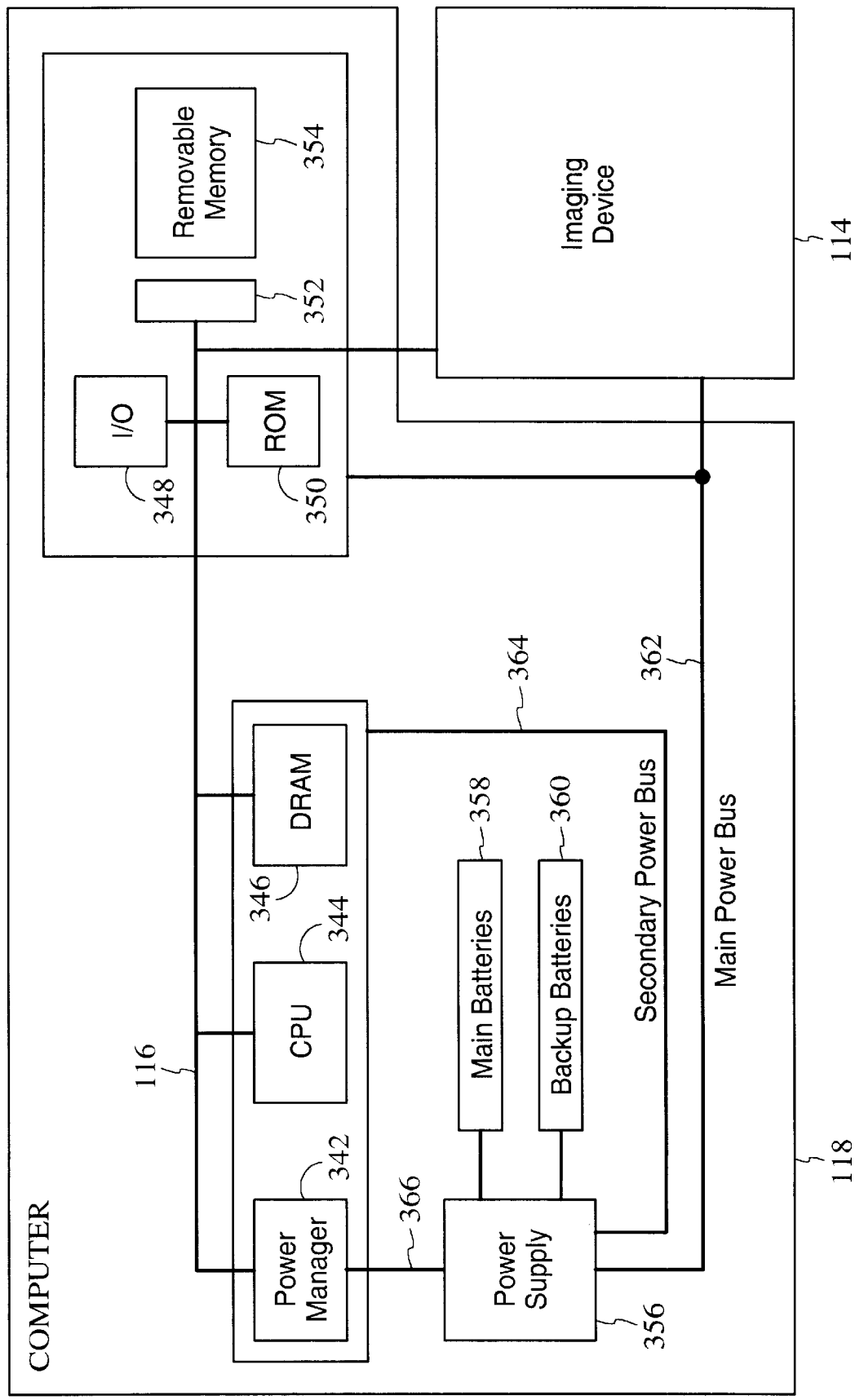
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and commnunicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

According to the present invention, the flexible architecture of the digital camera provides an improved method for displaying captured images in a digital camera. More specifically, the present invention provides a method and system for directly displaying image cells and for extending the cells of each image, such that the cells contain additional information regarding the image. In a preferred embodiment, image cells are extended through the use of an extended file format, and the additional information contained in the extended image cells takes the form of graphical icons, as explained further below.

Figure 4:
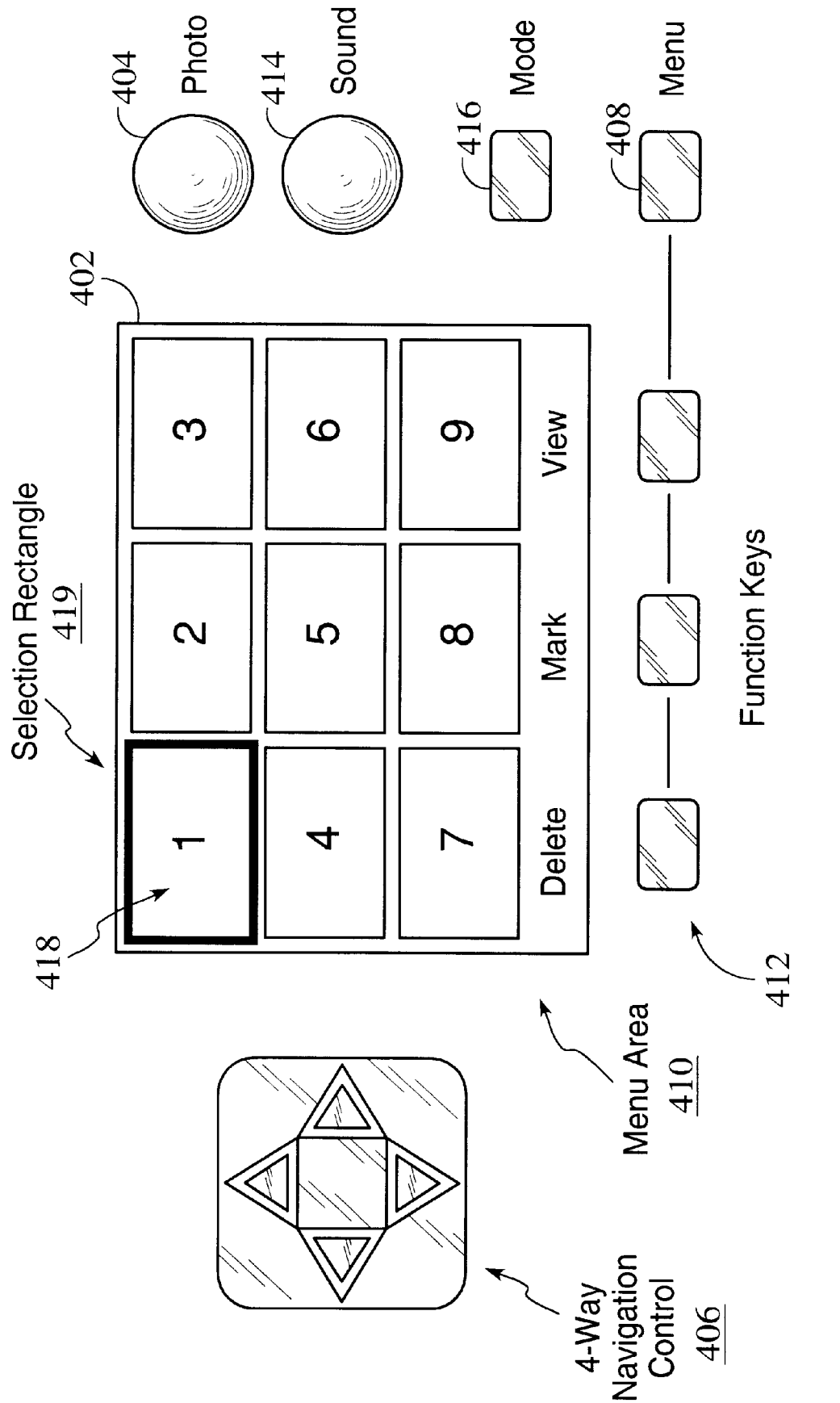
FIG. 4 is a block diagram depicting a user interface for the digital camera.

FIG. 4 is a block diagram depicting a user interface 400 for the digital camera as described in co-pending U.S. patent application Ser. No. 08/702,286, filed on Aug. 23, 1996, entitled "A Method and System For Grouping Images In A Digital Camera," and assigned to the Assignee of the present application. In one preferred embodiment, the user interface includes a view finder 402, an image capture button called a photo button 404, a four-way navigation control button 406, a menu button 408, a menu area 410 within the view finder 402, and function keys 412. The user interface may also include an optional sound button 414 and a mode button 416.

Referring again to FIGS. 1 and 4, the user interface 400 operates in two modes: view finder mode and review mode. In a preferred embodiment, the photo button 404 is a two position button. The view finder mode begins when a user aims the camera at an object 112 and presses the photo button 404 into the first position. Once this occurs, the view finder 402 displays the image of the object 112 as shown through the camera's imaging device 114. The user may then press the photo button 404 into the second position to capture the image shown in the view finder 402. Review mode begins by pressing any other button on the interface 400.

Referring again to FIG. 4, once in the review mode, the view finder 402 displays a series of cells 418 that represent the digital images that have been captured in the digital camera. The view finder 402 is shown here as displaying nine image cells 418. Each cell 418 displays a small-sized image corresponding to one of the captured images. The user may navigate through the series of displayed cells 418 in the view finder 402 using the four-way navigation control button 406 in order to select which image is displayed full-sized in the view finder 402. The cell 418 currently selected by the four-way navigation control 406 is encircled with a highlighted area 419, which is shown as a selection rectangle. Other shapes for the highlighted area are also suitable.

Although the user interface 400 provides many advantages, the cells 418 for displaying captured images suffer the same drawbacks as the cells used in conventional digital cameras. The principal drawbacks being a general failure in aiding the user in distinguishing among the captured images, and the requirement of processing each captured image in order to display its corresponding image cell 418.

According to the present invention, the failure of aiding the user in distinguishing among captured images is addressed by expanding the image cells 418, and by including additional information in the expanded image cells 418, besides a small graphic of the captured image.

Figure 5:
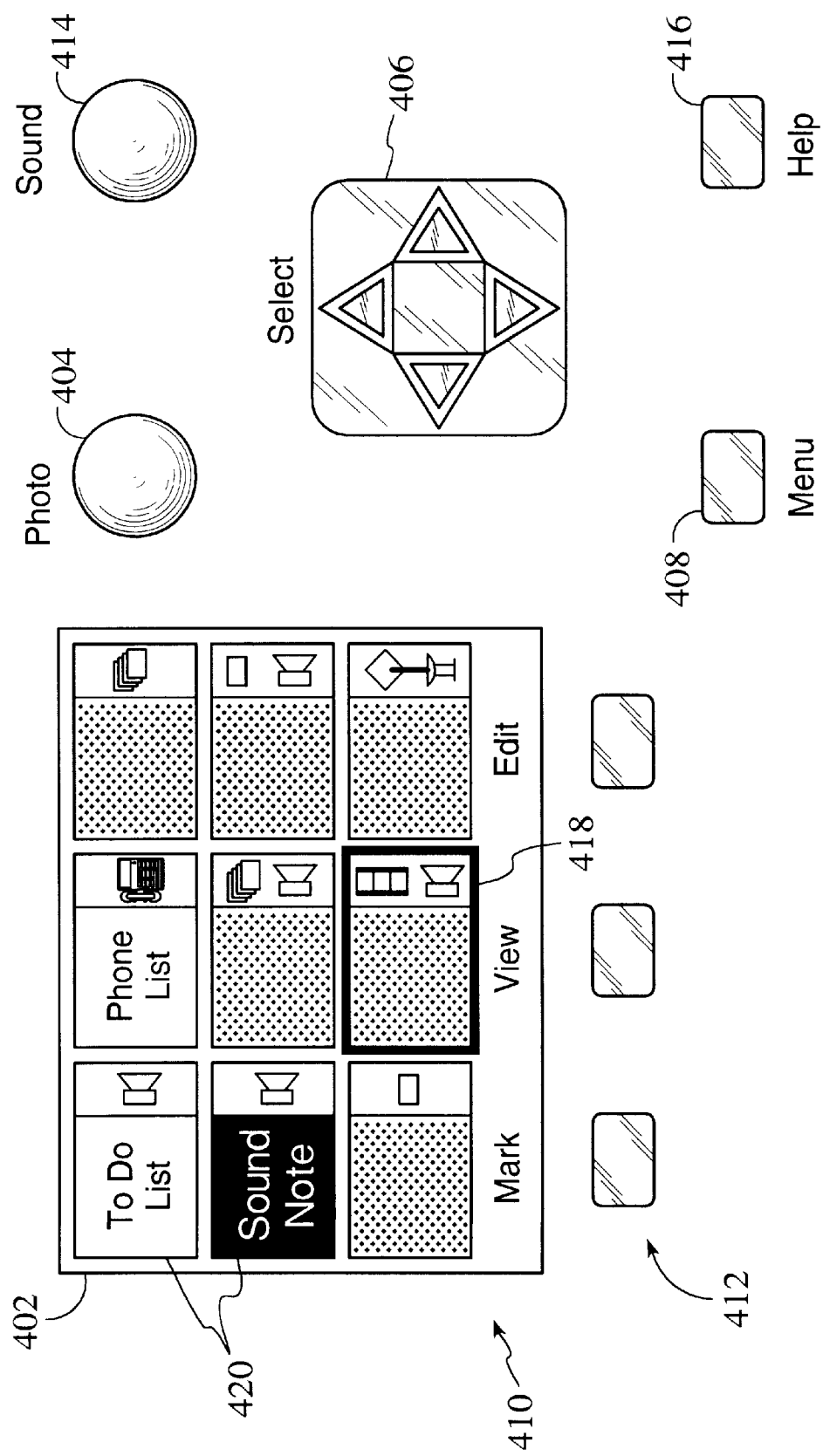
FIG. 5 is a block diagram showing a digital camera user interface having expanded cells in accordance with the present invention.

FIG. 5 is a block diagram showing a digital camera user interface 430 displaying a series of expanded cells 420 in accordance with the present invention. The user interface 430 is also shown with another preferred embodiment for the layout of the interface buttons, where like components in FIGS. 4 and 5 have like reference numerals.

Figures 6, 7:
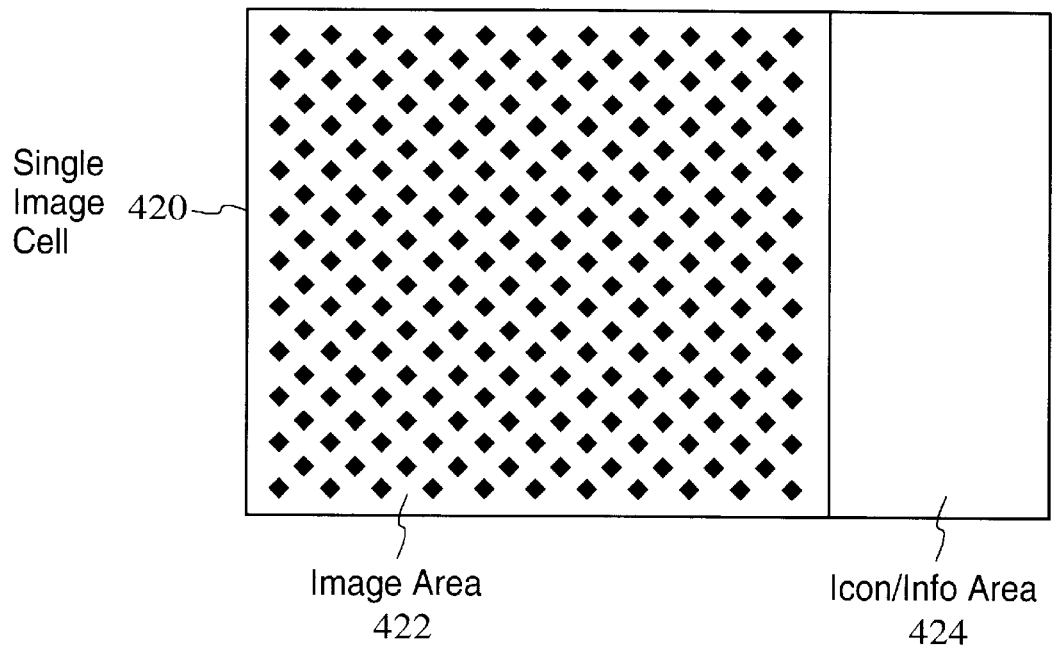
FIG. 6 is a block diagram illustrating the format of an expanded cell.
FIG. 7 is a table listing example media types and corresponding icons that may be associated with a captured image.

FIG. 6 is a block diagram illustrating the format of an expanded cell 420. According to the present invention, each cell 420 includes an image area 422 and an icon/information area 424. The icon/information area 424 may be placed in various positions relative to the image area 422. However, in a preferred embodiment, the icon/information area 424 is displayed on the right-hand side of each cell 420 as shown.

The icon/information area 424 is for displaying one or more graphical icons, and/or for displaying text information. The icons and text information displayed in the icon/information area 424 indicate to the user what media types have been associated with the image displayed in the image area 422. As used conventionally, the phrase "associating a media type with an object" means identifying the specific types of media included in that object, such as graphics, text, and sound.

FIG. 7 is a table listing example media types and corresponding icons that may be associated with a captured image. The media type of a captured image may represent a single image, a time lapse or burst image, a movie clip, or a panorama. The media type may also represent sound, where the corresponding icon indicates that a sound clip is attached to the image displayed in the image area 422.

Other media types may also be associated with a captured image that are not shown in FIG. 7, such as a snide show and a folder, for example. A slide show comprises several images stored sequentially in the same file, while a folder is one or more images stored in the directory or folder. With such media types, the image area 422 would display the first image in the group or a representative image from the folder, and the icon/information area 424 would display an graphical icon representing a slide show or folder, respectively.

Displaying icons and text information in the icon/information area 424 according to the present invention provides the user with an automatic method for categorizing and identifying common groups of captured images.

The present invention also eliminates the need for processing captured images when displaying the image cells 420. This is accomplished by extending the file format used to store the captured images.

Figure 8:
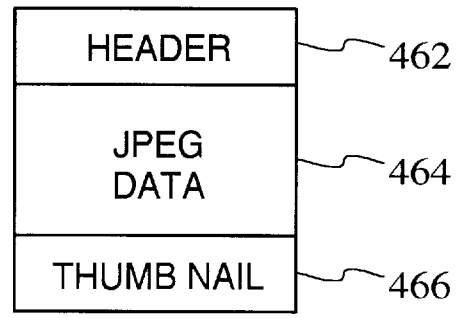
FIG. 8 is a block diagram of one preferred embodiment for a extended file format for storing a captured image that supports the display of thumb nail images in accordance with the present invention.

FIG. 8 is a block diagram of one preferred embodiment for a extended file format 460 for storing a captured image in accordance with the present invention. The extended file format 460 includes a standard header 462 for storing the date and time the image was captured, and JPEG data 464 representing the captured image in compressed form. And in contrast to prior file formats, the extended file format 460 also includes a small version of the captured image, referred to here as a thumb nail image 466.

Including the thumb nail image 466 in the extended file format 460 enables the digital camera to directly display an image in the image area 422 without processing the JPEG data 464. When the digital camera 118 is to display a series of image cells 420 in the view finder 402, the corresponding file formats 460 are first retrieved from memory. The digital camera 118 then displays the thumb nail image 466 directly from the file 460 in the image area 422 of the cell 420, rather than first decompressing and resizing the JPEG data 464. Avoiding the processing the actual JPEG data 464 in this manner improves the speed at which the camera 118 may display the series of image cells 420 in the view finder 402.

Figure 9:
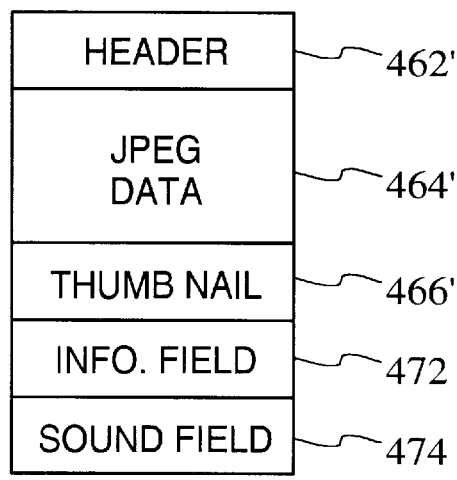
FIG. 9 is a block diagram of a second preferred embodiment for the extended file format that supports multiple media types.

FIG. 9 is a block diagram of a second preferred embodiment for the extended file format 470 that supports multiple media types. As in the previous embodiment, the extended file format 470 includes a standard header 462', JPEG data 464', and a thumb nail image 466'. To enable different media types to be associated with a captured image, the extended header 470 also includes an information field 472 and a sound field 474.

The information field 472 comprises a series of tags for storing information regarding the image represented by the JPEG data 464'. Media type tags indicate the media type of the image, such as whether the image is a single image or a panorama image, for example. The media type tags are used to select the type of icon is displayed in the icon/information area 424 of a cell 420 when the thumb nail 466 of the image is displayed.

In operation, when the digital camera 118 is required to display a set of cells 420 in the view finder 402, the digital camera 118 first retrieves each image's extended file 470 from memory. After the appropriate file is retrieved, the thumb nail 466' is displayed in the image area 422 of the cell 420. While the thumb nail is being displayed, the tags stored in the information field 472 are read. Based on the content of the tags, the appropriate icon is then displayed in the icon/information area 424 of the cell 420.

Besides media tags, the information field 472 may also include other types of tags for storing additional information regarding the image and/or the camera 118 itself. For example, a tag could be used to indicate the settings of the camera 118 at the time the image was captured, or indicate the identity of the camera manufacturer, for instance. The information in these tags may be accessed through the buttons on the camera interface 430. The information may then be displayed either as text in the icon/information area 424, or displayed in a dialog box that is displayed in the view finder 402.

Displaying media icons and other information in the icon/information area 424 provides the advantage of indicating to the user information regarding the images that the user otherwise would not have immediate access to. This feature provides a digital camera interface that is both easy to user and more user friendly than traditional interfaces.

Referring still to FIG. 9, as stated above the expanded file format 470 also includes a sound field 474. The sound field 474 contains digital sound data that has been recorded for the image using the sound button 414, or contains a sound clip that has otherwise been associated with the image. When the user selects one of the cells 420 in the view finder 402, the full-sized image is displayed in the view finder 402 from the JPEG data 464, while sound is played using the sound from the sound field 474.

The extended file format 470 of the present invention also supports multiple image media types. Multiple image media types are media types that comprise more than one image. Examples include a timelapse, a slide show and a movie clip. In multiple image media types, the multiple images are preferably stored in one file.

Figure 10:
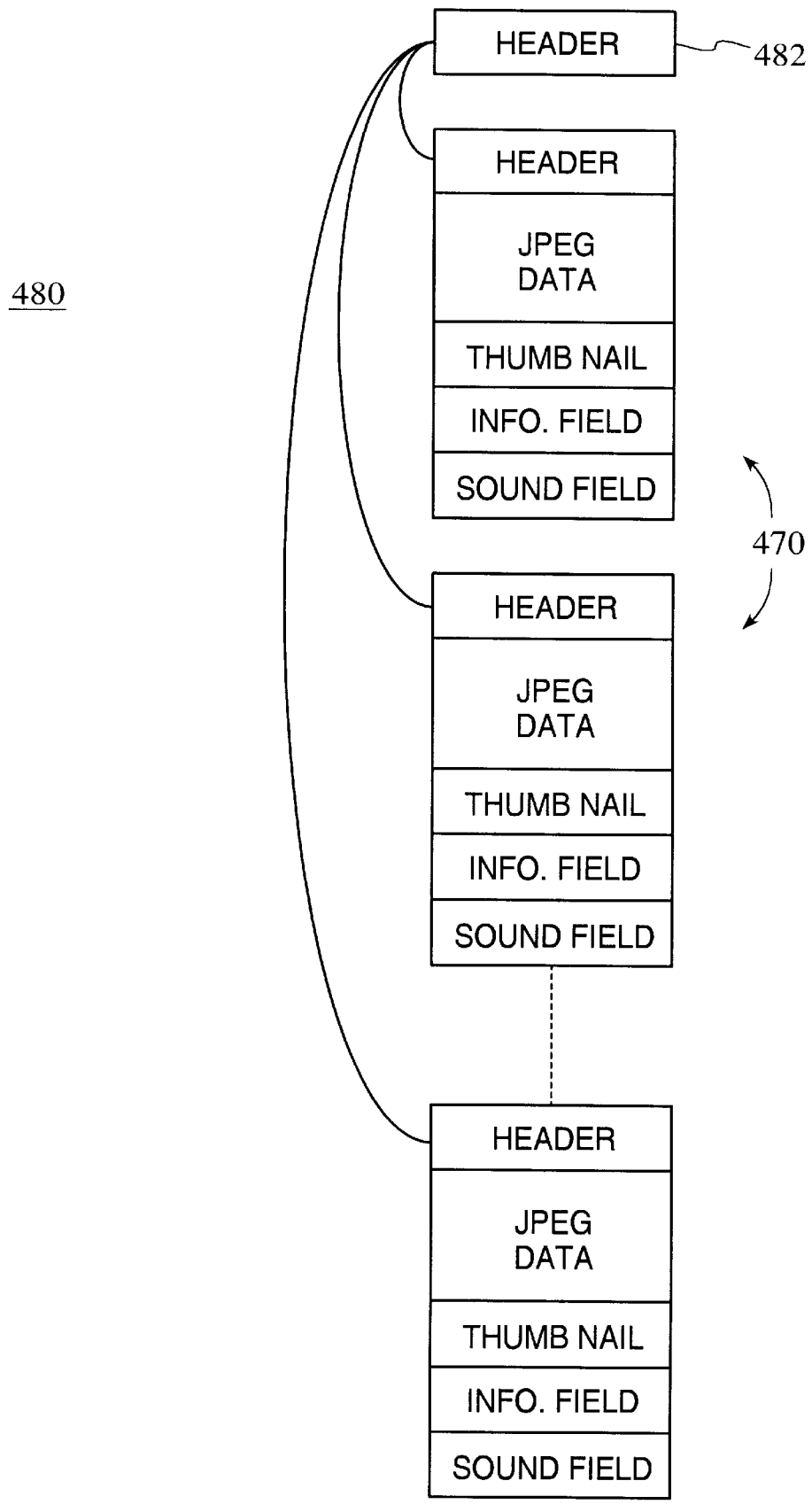
FIG. 10 is a block diagram illustrating a multiple image file format that supports multiple image media types.

FIG. 10 is a block diagram illustrating a multiple image file format 480 that supports these multiple image media types. As shown, the multiple image file format 480 preferably includes a series of extended file formats 470 that correspond to each image in the multiple image file. The multiple image file format 480 also includes a header 482 pointing to each of the extended file formats 470'. In operation, the file is retrieved and the header 482 is read in order to sequentially access each of the extended file formats 470. Each of the extended file formats 470 are then used to display their respective images in the view finder 402. Other formats for the multiple image file format 480 may also be used. For example, the file format 480 could comprise only one header 482, one thumbnail, and multiple JPEG data files.

A method and system for displaying images in the interface of a digital camera has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for displaying a series of images captured by a digital camera, the digital camera including a user interface that includes a view finder, the method comprising the steps of:

(a) storing each one of the captured images, each one of the captured images having one or more media types associated therewith, wherein the media types include a still image, a burst image, a time lapse image, a panorama image, a movie clip, and sound;

(b) displaying a plurality of image cells in the view finder, wherein each of the image cells corresponds to one of the captured images;

(c) providing at least one of the image cells with an image area for displaying the corresponding captured image;

(d) providing the at least one image cell with an icon area adjacent to the image area for displaying additional information regarding the corresponding captured image; and (e) displaying graphical icons in the icon area indicating the media types associated with the captured image.

2. A method as in claim 1 wherein step (a) further includes the step of:

(a1) storing each of the captured images in a file format that includes compressed image data, thumb nail image data, and information indicating the associated media types.

3. A method as in claim 2 wherein step (c) further includes the step of:

(c1) displaying the captured image in the at least one image cell by displaying the thumb nail image date from the respective file format.

4. A method as in claim 3 wherein step (a) further includes the step of:

(a2) storing media type information in the file format regarding the media types associated with the respective captured images.

5. A method as in claim 3 wherein step (d) further includes the step of:

(d3) displaying text in the icon area of the at least one image cell corresponding to the media type information stored in the file format.

6. A method as in claim 5 wherein step (a) further includes the step of:

(a3) storing media types comprising multiple images in a multiple media type file format, the multiple media type format including plurality of file formats for each of the multiple images, and a header for pointing to each of the file formats.

7. A system for displaying a series of images captured by a digital camera, the digital camera including a user interface that includes a view finder, the system comprising:

means for storing each one of the captured images, each one of the captured images having one or more media types associated therewith, wherein the media types include a still image, a burst image, a time lapse image, a panorama image, a movie clip, and sound;

means for displaying a plurality of image cells in the view finder, each of the image cells corresponding to one of the captured images, wherein at least one of the image cells includes an image area for displaying the corresponding captured image, and an icon area adjacent to the image area for displaying additional information regarding the corresponding captured image; and means for displaying graphical icons in the icon area indicating the media types associated with the captured image.

8. A system as in claim 7 wherein each of the captured images are stored in a file format that includes compressed image data, thumb nail image data, and information indicating the associated media types.

9. A system as in claim 8 wherein the captured image is displayed in the at least one image cell by displaying the thumb nail image data from the respective file format.

10. A system as in claim 9 wherein media type information for each captured image is stored in a respective file format.

11. A system as in claim 10 wherein text is displayed in the icon area of the at least one image cell corresponding to the media type information stored in the file format.

12. A system as in claim 11 wherein media types comprising multiple images are stored in a multiple media type file format, the multiple media type format including plurality of file formats for each of the multiple images, and a header for pointing to each of the file formats.

13. A digital camera device comprising:

a memory device coupled to the digital camera device for storing sets of image data, each set of the image data having one or more media types associated therewith, wherein the media types include a still image, a burst image, a time lapse image, a panorama image, a movie lip, and sound;

a memory manager for allocating storage locations within the memory device to store the sets of image data, the image data stored in a file format that includes the image data, a thumb nail image of the image data, and an information field for storing information regarding the image data, including the associated media types; and an interface coupled to the memory device for displaying a plurality of image cells corresponding to the image data, wherein at least one of the image cells includes an image area for displaying the thumb nail image of the corresponding image data, and an icon area adjacent to the image area for displaying additional information regarding the corresponding image data, including graphical icons indicating the media types associated with the captured image.

* * * * *

UNITED STATES PATENT AND TRADEMARK OFFICE
CERTIFICATE OF CORRECTION

PATENT NO.       : 5,903,309 C1
APPLICATION NO.  : 90/010683
DATED            : December 7, 2010
INVENTOR(S)      : Eric C. Anderson Page 1 of 1

It is certified that error appears in the above-identified patent and that said Letters Patent is hereby corrected as shown below:

Claim 7, at column 1, line 61, insert the word --additional-- so that the line reads "the image area for displaying additional information regarding the"

Claim 7, at column 1, line 64, insert the word --the-- so that the line reads "the media types associated with the captured image"

Claim 13, at column 2, line 10, insert the word --that-- so that the line reads "image data stored in a file format that includes the image"

Claim 24, at column 3, line 26, delete the word "other" so that the line reads "regarding the corresponding captured image; and"

Claim 26, at column 3, line 48, delete word "correspond" and replace it with the word --corresponds-- so that the line reads "each of the plurality of image cells corresponds to one of"

Claim 27, at column 4, line 6, delete the first occurrence of the word "a" so that the line reads "form and thumbnail image data that represents a"

Claim 3 (not subject to reexamination), at column 8, line 8 of Patent 5,903,309, as reflected in the above Reexamination Certificate, delete the word "date" and insert the word --data-- so that the line reads "image cell by displaying the thumb nail image data"

Signed and Sealed this
Nineteenth Day of July, 2011

David J. Kappos
*Director of the United States Patent and Trademark Office*

(12) EX PARTE REEXAMINATION CERTIFICATE (7908th)
United States Patent
Anderson

(10) Number: US 5,903,309 C1
(45) Certificate Issued: Dec. 7, 2010

(54) METHOD AND SYSTEM FOR DISPLAYING IMAGES AND ASSOCIATED MULTIMEDIA TYPES IN THE INTERFACE OF A DIGITAL CAMERA

(75) Inventor: Eric C. Anderson, San Jose, CA (US)

(73) Assignee: Flashpoint Technology, Inc., San Jose, CA (US)

Reexamination Request:
No. 90/010,683, Sep. 15, 2009
No. 90/009,693, Feb. 22, 2010

Reexamination Certificate for:
Patent No.: 5,903,309
Issued: May 11, 1999
Appl. No.: 08/716,018
Filed: Sep. 19, 1996

(51) Int. Cl.
*H04N 5/76* (2006.01)
*H04N 5/222* (2006.01)

(52) U.S. Cl. .................. 348/333.02; 348/231.5; 348/333.05; 348/E5.042; 348/E5.047; 715/839

(58) Field of Classification Search ............ 348/333
See application file for complete search history.

(56) References Cited

U.S. PATENT DOCUMENTS

| | | |
|---|---|---|
| 2,289,555 A | 7/1942 | Simons |
| 3,814,227 A | 6/1974 | Stern |
| 3,971,065 A | 7/1976 | Bayer |
| 3,991,625 A | 11/1976 | Preston |
| 4,011,571 A | 3/1977 | Okuzawa |
| 4,017,680 A | 4/1977 | Anderson et al. |
| 4,125,111 A | 11/1978 | Hudspeth et al. |
| 4,158,208 A | 6/1979 | Dischert |
| 4,172,327 A | 10/1979 | Kuehn et al. |
| 4,195,317 A | 3/1980 | Stratton |

(Continued)

FOREIGN PATENT DOCUMENTS

| | | |
|---|---|---|
| EP | 0122094 A2 | 10/1984 |
| EP | 0421769 A2 | 4/1991 |
| EP | 0422447 A2 | 4/1991 |
| EP | 0463856 A2 | 1/1992 |
| EP | 0519379 A2 | 6/1992 |
| EP | 0528084 A1 | 2/1993 |
| EP | 0555048 A2 | 8/1993 |
| EP | 0568468 A2 | 11/1993 |
| EP | 0617542 A2 | 9/1994 |
| EP | 0650125 A1 | 4/1995 |

(Continued)

OTHER PUBLICATIONS

Foley et al., *Computer Graphics—Principles and Practice, Second Edition in C*, Addison-Wesley Publishing Company, New York, 1996, pp. 132–137, 506–509, 755–759.

Buderi, Robert, "Photos That Talk," *Upside Today*, Jan. 27, 1999, <http://www.uspide.com/texis/mvm/story?id=36b0cb860>.

(Continued)

*Primary Examiner*—Andrew L Nalven

(57) ABSTRACT

A method and system for displaying a series of images captured by a digital camera, which includes a user interface that includes a view finder. The method and system first stores each of the captured images in memory, and then displays a plurality of image cells in the view finder; wherein each of the image cells corresponds to one of the captured images. The method and system further provides at least one of the image cells with an image area for displaying the corresponding captured image, and further provides the at least one image cell with an icon area for displaying additional information regarding the corresponding captured image.

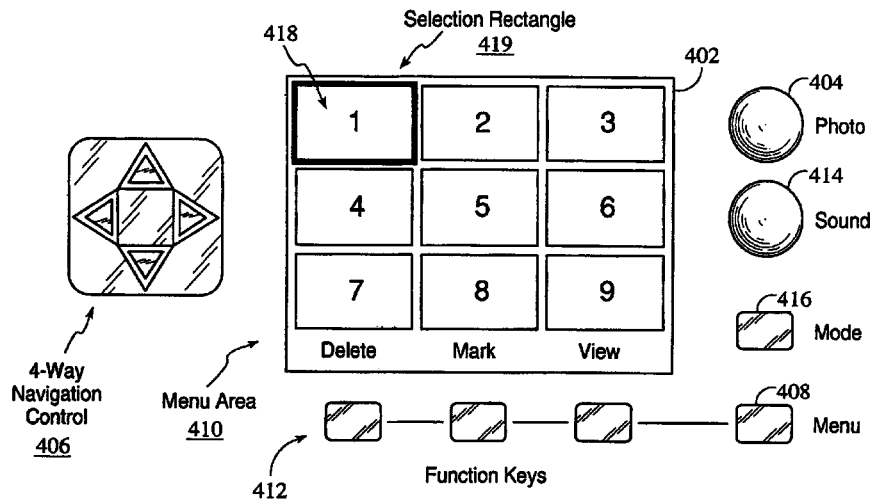

U.S. PATENT DOCUMENTS

| | | |
|---|---|---|
| 4,234,890 A | 11/1980 | Astle et al. |
| 4,325,080 A | 4/1982 | Satoh |
| 4,337,479 A | 6/1982 | Tomimoto et al. |
| 4,347,618 A | 8/1982 | Kavouras et al. |
| 4,364,650 A | 12/1982 | Terashita et al. |
| 4,403,303 A | 9/1983 | Howes et al. |
| 4,416,282 A | 11/1983 | Saulson et al. |
| 4,456,931 A | 6/1984 | Toyoda et al. |
| 4,466,230 A | 8/1984 | Osselaere |
| 4,470,067 A | 9/1984 | Mino |
| 4,471,382 A | 9/1984 | Toyoda et al. |
| 4,519,692 A | 5/1985 | Michalik |
| 4,531,161 A | 7/1985 | Murakoshi |
| 4,540,276 A | 9/1985 | Ost |
| 4,574,319 A | 3/1986 | Konishi |
| 4,601,055 A | 7/1986 | Kent |
| 4,623,930 A | 11/1986 | Oshima et al. |
| 4,691,253 A | 9/1987 | Silver |
| 4,723,169 A | 2/1988 | Kaji |
| 4,736,224 A | 4/1988 | Watanabe |
| 4,739,409 A | 4/1988 | Baumeister |
| 4,772,941 A | 9/1988 | Noble |
| 4,774,600 A | 9/1988 | Baumeister |
| 4,823,283 A | 4/1989 | Diehm |
| 4,827,347 A | 5/1989 | Bell |
| 4,855,831 A | 8/1989 | Miyamoto |
| 4,866,292 A | 9/1989 | Takemoto et al. |
| 4,882,683 A | 11/1989 | Rupp et al. |
| 4,887,161 A | 12/1989 | Watanabe et al. |
| 4,888,812 A | 12/1989 | Dinan et al. |
| 4,893,198 A | 1/1990 | Little |
| 4,907,089 A | 3/1990 | Yamaguchi |
| 4,916,435 A | 4/1990 | Fuller |
| 4,935,809 A | 6/1990 | Hayashi et al. |
| 4,937,676 A | 6/1990 | Finelli et al. |
| 4,937,685 A | 6/1990 | Barker et al. |
| 4,965,675 A | 10/1990 | Hori et al. |
| 4,972,495 A | 11/1990 | Blike et al. |
| 4,982,291 A | 1/1991 | Kurahashi et al. |
| 4,992,887 A | 2/1991 | Aragaki |
| 5,001,697 A | 3/1991 | Torres |
| 5,007,027 A | 4/1991 | Shimoi |
| 5,016,107 A | 5/1991 | Sasson |
| 5,018,017 A | 5/1991 | Sasaki et al. |
| 5,020,012 A | 5/1991 | Stockberger |
| 5,021,989 A | 6/1991 | Fujisawa et al. |
| 5,027,150 A | 6/1991 | Inoue |
| 5,031,329 A | 7/1991 | Smallidge |
| 5,032,918 A | 7/1991 | Ota et al. |
| 5,032,926 A | 7/1991 | Imai et al. |
| 5,034,804 A | 7/1991 | Sasaki et al. |
| 5,040,068 A | 8/1991 | Parulski |
| 5,040,070 A | 8/1991 | Higashitsutsumi |
| 5,043,801 A | 8/1991 | Watanabe |
| 5,043,816 A | 8/1991 | Nakano |
| 5,057,924 A | 10/1991 | Yamada |
| 5,063,600 A | 11/1991 | Norwood |
| 5,065,246 A | 11/1991 | Takemoto et al. |
| 5,067,029 A | 11/1991 | Takahashi |
| 5,070,406 A | 12/1991 | Kinoshita |
| 5,073,823 A | 12/1991 | Yamada et al. |
| 5,077,582 A | 12/1991 | Kravette et al. |
| 5,083,383 A | 1/1992 | Heger |
| 5,093,716 A | 3/1992 | Kondo et al. |
| 5,099,262 A | 3/1992 | Tanaka et al. |
| 5,101,225 A | 3/1992 | Wash |
| 5,101,364 A | 3/1992 | Davenport |
| 5,106,107 A | 4/1992 | Justus |
| 5,122,827 A | 6/1992 | Saegusa et al. |
| 5,123,088 A | 6/1992 | Kasahara et al. |
| 5,124,537 A | 6/1992 | Chandler et al. |
| 5,124,814 A | 6/1992 | Takahashi et al. |
| 5,130,812 A | 7/1992 | Yamaoka |
| 5,138,459 A | 8/1992 | Roberts et al. |
| 5,138,460 A | 8/1992 | Egawa |
| 5,140,358 A | 8/1992 | Tokunaga |
| 5,142,319 A | 8/1992 | Wakabayashi |
| 5,144,358 A | 9/1992 | Tsuru et al. |
| 5,144,445 A | 9/1992 | Higashitsutsumi |
| 5,146,353 A | 9/1992 | Isoguchi et al. |
| 5,153,729 A | 10/1992 | Saito |
| 5,153,730 A | 10/1992 | Nagasaki |
| 5,159,364 A | 10/1992 | Yanagisawa et al. |
| 5,161,012 A | 11/1992 | Choi |
| 5,161,025 A | 11/1992 | Nakao |
| 5,161,535 A | 11/1992 | Short |
| 5,164,751 A | 11/1992 | Weyer |
| 5,164,831 A | 11/1992 | Kuchta |
| 5,179,653 A | 1/1993 | Fuller |
| 5,187,776 A | 2/1993 | Yanker |
| 5,189,404 A | 2/1993 | Masimo et al. |
| 5,189,490 A | 2/1993 | Shetty |
| 5,193,538 A | 3/1993 | Ekwall |
| 5,194,944 A | 3/1993 | Uchiyama |
| 5,198,851 A | 3/1993 | Ogawa |
| 5,199,101 A | 3/1993 | Cusick et al. |
| 5,200,818 A | 4/1993 | Neta et al. |
| 5,218,459 A | 6/1993 | Parulski et al. |
| 5,218,647 A | 6/1993 | Blonstein |
| 5,220,420 A | 6/1993 | Hoarty et al. |
| 5,220,614 A | 6/1993 | Crain |
| 5,223,935 A | 6/1993 | Tsuji |
| 5,224,207 A | 6/1993 | Filion et al. |
| 5,229,856 A | 7/1993 | Koshiishi |
| 5,231,511 A | 7/1993 | Kodama et al. |
| 5,231,651 A | 7/1993 | Ozaki |
| 5,237,648 A | 8/1993 | Mills |
| 5,237,650 A | 8/1993 | Priem et al. |
| 5,239,419 A | 8/1993 | Kim |
| 5,247,321 A | 9/1993 | Kazami |
| 5,247,327 A | 9/1993 | Suzuka |
| 5,253,071 A | 10/1993 | MacKay |
| 5,260,795 A | 11/1993 | Sakai |
| 5,262,863 A | 11/1993 | Okada |
| 5,262,867 A | 11/1993 | Kojima |
| 5,262,868 A | 11/1993 | Kaneko et al. |
| 5,262,869 A | 11/1993 | Hong |
| 5,270,821 A | 12/1993 | Samuels |
| 5,270,831 A | 12/1993 | Parulski et al. |
| 5,274,458 A | 12/1993 | Kondo et al. |
| 5,276,563 A | 1/1994 | Ogawa |
| 5,283,560 A | 2/1994 | Bartlett |
| 5,283,792 A | 2/1994 | Davies |
| 5,287,192 A | 2/1994 | Iizuka |
| 5,301,026 A | 4/1994 | Lee |
| 5,302,997 A | 4/1994 | Cocca |
| 5,307,318 A | 4/1994 | Nemoto |
| 5,309,243 A | 5/1994 | Tsai |
| 5,311,240 A | 5/1994 | Wheeler |
| 5,331,366 A | 7/1994 | Tokunaga |
| 5,335,072 A | 8/1994 | Tanaka et al. |
| 5,341,466 A | 8/1994 | Perlin |
| 5,343,246 A | 8/1994 | Arai et al. |
| 5,343,386 A | 8/1994 | Barber |
| 5,343,509 A | 8/1994 | Dounies |
| 5,345,552 A | 9/1994 | Brown |
| 5,359,427 A | 10/1994 | Sato |
| 5,359,728 A | 10/1994 | Rusnack |
| 5,367,318 A | 11/1994 | Beaudin et al. |
| 5,373,153 A | 12/1994 | Cumberledge |
| 5,375,160 A | 12/1994 | Guidon et al. |

| Patent | Kind | Date | Name |
|---|---|---|---|
| 5,386,111 | A | 1/1995 | Zimmerman |
| 5,386,177 | A | 1/1995 | Uhm |
| 5,386,552 | A | 1/1995 | Garney |
| 5,390,026 | A | 2/1995 | Lim |
| 5,390,314 | A | 2/1995 | Swanson |
| 5,392,462 | A | 2/1995 | Komaki |
| 5,396,343 | A | 3/1995 | Hanselman |
| 5,402,170 | A | 3/1995 | Parulski et al. |
| 5,402,171 | A | 3/1995 | Tagami et al. |
| 5,404,316 | A | 4/1995 | Klingler et al. |
| 5,404,505 | A | 4/1995 | Levinson |
| 5,408,265 | A | 4/1995 | Sasaki |
| 5,414,811 | A | 5/1995 | Parulski et al. |
| 5,416,556 | A | 5/1995 | Suzuki et al. |
| 5,420,635 | A | 5/1995 | Konishi et al. |
| 5,425,137 | A | 6/1995 | Mohan et al. |
| 5,428,733 | A | 6/1995 | Carr |
| 5,432,871 | A | 7/1995 | Novik |
| 5,432,900 | A | 7/1995 | Rhodes et al. |
| 5,434,618 | A | 7/1995 | Hayashi et al. |
| 5,434,958 | A | 7/1995 | Surma et al. |
| 5,434,969 | A | 7/1995 | Heilveil et al. |
| 5,436,657 | A | 7/1995 | Fukuoka |
| 5,436,659 | A | 7/1995 | Vincent |
| 5,440,401 | A | 8/1995 | Parulski et al. |
| 5,442,465 | A | 8/1995 | Compton |
| 5,444,482 | A | 8/1995 | Misawa et al. |
| 5,448,372 | A | 9/1995 | Axman et al. |
| 5,452,145 | A | 9/1995 | Wakui et al. |
| 5,459,830 | A | 10/1995 | Ohba et al. |
| 5,461,429 | A | 10/1995 | Konishi et al. |
| 5,463,728 | A | 10/1995 | Blahut et al. |
| 5,463,729 | A | 10/1995 | Kitaguchi et al. |
| 5,465,133 | A | 11/1995 | Aoki et al. |
| 5,467,288 | A | 11/1995 | Fasciano et al. |
| 5,473,370 | A | 12/1995 | Moronaga et al. |
| 5,473,371 | A | 12/1995 | Choi |
| 5,475,428 | A | 12/1995 | Hintz et al. |
| 5,475,441 | A | 12/1995 | Parulski et al. |
| 5,475,812 | A | 12/1995 | Corona et al. |
| 5,477,264 | A | 12/1995 | Sarbadhikari et al. |
| 5,481,330 | A | 1/1996 | Yamasaki |
| 5,481,667 | A | 1/1996 | Bieniek et al. |
| 5,486,853 | A | 1/1996 | Baxter |
| 5,488,414 | A | 1/1996 | Hirasawa |
| 5,489,945 | A | 2/1996 | Kannegundla |
| 5,489,955 | A | 2/1996 | Satoh |
| 5,493,332 | A | 2/1996 | Dalton et al. |
| 5,493,335 | A | 2/1996 | Parulski et al. |
| 5,495,342 | A | 2/1996 | Harigaya |
| 5,495,559 | A | 2/1996 | Makino |
| 5,496,106 | A | 3/1996 | Anderson |
| 5,497,193 | A | 3/1996 | Mitsuhashi |
| 5,500,936 | A | 3/1996 | Allen et al. |
| 5,502,486 | A | 3/1996 | Ueda |
| 5,510,830 | A | 4/1996 | Ohia et al. |
| 5,512,941 | A | 4/1996 | Takahashi |
| 5,513,306 | A | 4/1996 | Mills |
| 5,513,342 | A | 4/1996 | Leong et al. |
| 5,515,101 | A | 5/1996 | Yoshida |
| 5,517,606 | A | 5/1996 | Matheny et al. |
| 5,519,815 | A | 5/1996 | Klassen |
| 5,521,639 | A | 5/1996 | Tomura |
| 5,521,663 | A | 5/1996 | Norris |
| 5,521,717 | A | 5/1996 | Maeda |
| 5,521,841 | A | 5/1996 | Arman et al. |
| 5,523,786 | A | 6/1996 | Parulski |
| 5,523,857 | A | 6/1996 | Fukushima |
| 5,525,957 | A | 6/1996 | Tanaka |
| 5,528,293 | A | 6/1996 | Watanabe |
| 5,528,315 | A | 6/1996 | Sugiyama |
| 5,530,235 | A | 6/1996 | Stefik et al. |
| 5,532,740 | A | 7/1996 | Wakui |
| 5,534,975 | A | 7/1996 | Stefik et al. |
| 5,537,151 | A | 7/1996 | Orr |
| 5,537,530 | A | 7/1996 | Edgar |
| 5,539,528 | A | 7/1996 | Tawa |
| 5,539,535 | A | 7/1996 | Aizawa et al. |
| 5,539,658 | A | 7/1996 | McCullough |
| 5,541,656 | A | 7/1996 | Kare et al. |
| 5,548,371 | A | 8/1996 | Kawahara |
| 5,548,409 | A | 8/1996 | Ohta et al. |
| 5,550,646 | A | 8/1996 | Hassan et al. |
| 5,550,938 | A | 8/1996 | Hayakawa et al. |
| 5,552,806 | A | 9/1996 | Lenchik |
| 5,553,277 | A | 9/1996 | Hirano et al. |
| 5,555,193 | A | 9/1996 | Tsinberg et al. |
| 5,559,554 | A | 9/1996 | Uekane et al. |
| 5,560,022 | A | 9/1996 | Dunstan et al. |
| 5,563,655 | A | 10/1996 | Lathrop |
| 5,568,167 | A | 10/1996 | Galbi |
| 5,568,192 | A | 10/1996 | Hannah |
| 5,572,233 | A | 11/1996 | Kakegawa |
| 5,574,933 | A | 11/1996 | Horst |
| 5,576,757 | A | 11/1996 | Roberts et al. |
| 5,576,759 | A | 11/1996 | Kawamura et al. |
| 5,577,190 | A | 11/1996 | Peters |
| 5,578,757 | A | 11/1996 | Roth |
| 5,579,048 | A | 11/1996 | Hirasawa |
| 5,579,450 | A | 11/1996 | Hanyu |
| 5,581,311 | A | 12/1996 | Kuroiwa |
| 5,585,845 | A | 12/1996 | Kawamura |
| 5,587,740 | A | 12/1996 | Brennan |
| 5,589,902 | A | 12/1996 | Gruel et al. |
| 5,590,306 | A | 12/1996 | Watanabe et al. |
| 5,592,301 | A | 1/1997 | Shimada |
| 5,594,524 | A | 1/1997 | Sasagaki |
| 5,597,193 | A | 1/1997 | Conner |
| 5,606,365 | A | 2/1997 | Maurinus |
| 5,608,491 | A | 3/1997 | Sasagaki |
| 5,610,653 | A | 3/1997 | Abecassis |
| 5,619,738 | A | 4/1997 | Petruchik |
| 5,621,459 | A | 4/1997 | Ueda |
| 5,621,906 | A | 4/1997 | O'Neill |
| 5,625,412 | A | 4/1997 | Aciu et al. |
| 5,630,017 | A | 5/1997 | Gasper et al. |
| 5,631,701 | A | 5/1997 | Miyake |
| 5,631,871 | A | 5/1997 | Park et al. |
| 5,633,573 | A | 5/1997 | Van Phuoc et al. |
| 5,633,678 | A | 5/1997 | Parulski et al. |
| 5,633,976 | A | 5/1997 | Ogino |
| 5,634,000 | A | 5/1997 | Wicht |
| 5,635,983 | A | 6/1997 | Ohmori |
| 5,635,984 | A | 6/1997 | Lee |
| 5,637,871 | A | 6/1997 | Piety et al. |
| 5,638,123 | A | 6/1997 | Yamaguchi |
| 5,638,498 | A | 6/1997 | Tyler et al. |
| 5,638,501 | A | 6/1997 | Gough et al. |
| 5,640,193 | A | 6/1997 | Wellner |
| 5,640,202 | A | 6/1997 | Kondo |
| 5,640,204 | A | 6/1997 | Tsutsui |
| 5,640,627 | A | 6/1997 | Nakano |
| 5,644,694 | A | 7/1997 | Appleton |
| 5,648,816 | A | 7/1997 | Wakui |
| 5,649,032 | A | 7/1997 | Burt et al. |
| 5,649,186 | A | 7/1997 | Ferguson |
| 5,651,107 | A | 7/1997 | Frank et al. |
| 5,659,547 | A | 8/1997 | Scarr et al. |
| 5,659,729 | A | 8/1997 | Nielsen |
| 5,664,087 | A | 9/1997 | Tani et al. |
| 5,666,580 | A | 9/1997 | Ito et al. |
| 5,668,639 | A | 9/1997 | Martin |

| | | | | | |
|---|---|---|---|---|---|
| 5,671,378 A | 9/1997 | Acker et al. | 5,784,629 A | 7/1998 | Anderson |
| 5,671,440 A | 9/1997 | Curry | 5,786,851 A | 7/1998 | Kondo |
| 5,673,304 A | 9/1997 | Connor et al. | D396,853 S | 8/1998 | Cooper et al. |
| 5,674,003 A | 10/1997 | Andersen | 5,790,094 A | 8/1998 | Tanigawa et al. |
| 5,675,358 A | 10/1997 | Bullock et al. | 5,790,800 A | 8/1998 | Gauvin et al. |
| 5,675,752 A | 10/1997 | Scott et al. | 5,796,428 A | 8/1998 | Matsumoto et al. |
| 5,680,533 A | 10/1997 | Yamato | 5,796,875 A | 8/1998 | Read |
| 5,680,534 A | 10/1997 | Yamato et al. | 5,797,051 A | 8/1998 | McIntyre |
| 5,682,197 A | 10/1997 | Moghadam et al. | 5,801,685 A | 9/1998 | Miller et al. |
| 5,682,207 A | 10/1997 | Takeda et al. | 5,801,770 A | 9/1998 | Paff et al. |
| 5,682,326 A | 10/1997 | Klingler et al. | 5,801,773 A | 9/1998 | Ikeda |
| 5,682,441 A | 10/1997 | Ligtenberg et al. | 5,805,153 A | 9/1998 | Nielsen |
| 5,684,511 A | 11/1997 | Westerink et al. | 5,805,163 A | 9/1998 | Bagnas |
| 5,684,542 A | 11/1997 | Tsukagoshi | 5,805,829 A | 9/1998 | Cohen et al. |
| 5,687,408 A | 11/1997 | Park | 5,806,005 A | 9/1998 | Hull |
| 5,699,109 A | 12/1997 | Nishimura et al. | 5,806,072 A | 9/1998 | Kuba et al. |
| 5,703,644 A | 12/1997 | Mori et al. | 5,815,160 A | 9/1998 | Kikuchi |
| 5,706,049 A | 1/1998 | Moghadam et al. | 5,815,201 A | 9/1998 | Hashimoto |
| 5,706,097 A | 1/1998 | Schelling et al. | 5,818,977 A | 10/1998 | Tansley |
| 5,706,457 A | 1/1998 | Dwyer et al. | 5,819,103 A | 10/1998 | Endoh et al. |
| 5,708,810 A | 1/1998 | Kern et al. | 5,821,997 A | 10/1998 | Kawamura |
| 5,711,330 A | 1/1998 | Nelson | 5,822,492 A | 10/1998 | Wakui et al. |
| 5,719,967 A | 2/1998 | Sekine | 5,822,581 A | 10/1998 | Christeson |
| 5,719,978 A | 2/1998 | Kakii et al. | 5,828,406 A | 10/1998 | Parulski |
| 5,719,987 A | 2/1998 | Kawamura | 5,828,793 A | 10/1998 | Mann |
| 5,721,908 A | 2/1998 | Lagarde | 5,831,590 A | 11/1998 | Ikedo |
| 5,721,909 A | 2/1998 | Oulid-Aissa et al. | 5,831,872 A | 11/1998 | Pan |
| 5,724,070 A | 3/1998 | Denninghoff et al. | 5,835,761 A | 11/1998 | Ishii et al. |
| 5,724,475 A | 3/1998 | Kirsten | 5,835,772 A | 11/1998 | Thurlo |
| 5,724,579 A | 3/1998 | Suzuki | 5,838,325 A | 11/1998 | Deen et al. |
| 5,727,112 A | 3/1998 | Kellar et al. | 5,841,422 A | 11/1998 | Shyu |
| 5,727,159 A | 3/1998 | Kikinis | 5,841,471 A | 11/1998 | Endsley et al. |
| 5,729,289 A | 3/1998 | Etoh | 5,845,166 A | 12/1998 | Fellegara |
| 5,734,427 A | 3/1998 | Hayashi | 5,847,706 A | 12/1998 | Kingsley |
| 5,734,436 A | 3/1998 | Abe | 5,848,193 A | 12/1998 | Garcia |
| 5,734,915 A | 3/1998 | Roewer | 5,848,420 A | 12/1998 | Xu |
| 5,737,032 A | 4/1998 | Stenzel | 5,850,483 A | 12/1998 | Takabatake et al. |
| 5,737,476 A | 4/1998 | Kim | 5,852,502 A | 12/1998 | Beckett |
| 5,737,491 A | 4/1998 | Allen et al. | 5,861,918 A | 1/1999 | Anderson |
| 5,740,267 A | 4/1998 | Echerer | 5,862,218 A | 1/1999 | Steinberg |
| 5,740,801 A | 4/1998 | Branson | 5,867,214 A | 2/1999 | Anderson |
| 5,742,339 A | 4/1998 | Wakui | 5,870,756 A | 2/1999 | Nakata |
| 5,742,475 A | 4/1998 | Riddiford | 5,873,007 A | 2/1999 | Ferrada Suarez |
| 5,742,504 A | 4/1998 | Meyer et al. | 5,874,959 A | 2/1999 | Rowe |
| 5,742,659 A | 4/1998 | Atac | 5,877,746 A | 3/1999 | Parks et al. |
| 5,742,698 A | 4/1998 | Minami et al. | 5,881,205 A | 3/1999 | Andrew |
| 5,748,326 A | 5/1998 | Thompson-Bell et al. | 5,883,610 A | 3/1999 | Jeon |
| 5,748,831 A | 5/1998 | Kubo | 5,892,511 A | 4/1999 | Gelsinger et al. |
| 5,751,350 A | 5/1998 | Tanaka | 5,892,847 A | 4/1999 | Johnson |
| 5,752,244 A | 5/1998 | Rose et al. | 5,896,131 A | 4/1999 | Alexander |
| 5,754,873 A | 5/1998 | Nolan | 5,896,203 A | 4/1999 | Shibata |
| 5,757,418 A | 5/1998 | Inagaki | 5,898,434 A | 4/1999 | Small et al. |
| 5,757,427 A | 5/1998 | Miyaguchi | 5,898,779 A | 4/1999 | Squilla et al. |
| 5,757,468 A | 5/1998 | Patton et al. | 5,898,833 A | 4/1999 | Kidder |
| 5,758,180 A | 5/1998 | Duffy et al. | 5,900,909 A | 5/1999 | Parulski et al. |
| 5,760,767 A | 6/1998 | Shore et al. | 5,901,303 A | 5/1999 | Chew |
| 5,761,655 A | 6/1998 | Hoffman | 5,903,309 A | 5/1999 | Anderson |
| 5,761,686 A | 6/1998 | Bloomberg | 5,903,786 A | 5/1999 | Goto |
| 5,764,276 A | 6/1998 | Martin et al. | 5,907,315 A | 5/1999 | Vlahos et al. |
| 5,764,291 A | 6/1998 | Fullam | 5,910,805 A | 6/1999 | Hickey et al. |
| 5,767,897 A | 6/1998 | Howell | 5,917,488 A | 6/1999 | Anderson et al. |
| 5,767,904 A | 6/1998 | Miyake | 5,920,726 A | 7/1999 | Anderson |
| 5,769,713 A | 6/1998 | Katayama | 5,926,208 A | 7/1999 | Noonen et al. |
| 5,771,034 A | 6/1998 | Gibson | 5,929,904 A | 7/1999 | Uchida |
| 5,773,810 A | 6/1998 | Hussey | 5,933,137 A | 8/1999 | Anderson |
| 5,774,131 A | 6/1998 | Kim | 5,937,106 A | 8/1999 | Murayama |
| 5,781,175 A | 7/1998 | Hara | 5,938,766 A | 8/1999 | Anderson et al. |
| 5,781,650 A | 7/1998 | Lobo | 5,940,080 A | 8/1999 | Ruehle et al. |
| 5,781,798 A | 7/1998 | Beatty et al. | 5,940,121 A | 8/1999 | Mcintyre et al. |
| 5,784,177 A | 7/1998 | Sanchez et al. | 5,943,050 A | 8/1999 | Bullock et al. |
| 5,784,525 A | 7/1998 | Bell | 5,943,093 A | 8/1999 | Anderson et al. |

| | | | | | | |
|---|---|---|---|---|---|---|
| 5,949,408 | A | 9/1999 | Kang et al. | 6,111,604 A | 8/2000 | Hashimoto |
| 5,949,432 | A | 9/1999 | Gough et al. | 6,118,480 A | 9/2000 | Anderson et al. |
| 5,949,474 | A | 9/1999 | Gerszberg et al. | 6,122,003 A | 9/2000 | Anderson |
| 5,949,496 | A | 9/1999 | Kim | 6,122,005 A | 9/2000 | Sasaki et al. |
| 5,949,950 | A | 9/1999 | Kubo | 6,122,409 A | 9/2000 | Boggs et al. |
| 5,956,084 | A | 9/1999 | Moronaga et al. | 6,128,013 A | 10/2000 | Prabhu |
| 5,963,670 | A | 10/1999 | Lipson et al. | 6,128,413 A | 10/2000 | Benamara |
| 5,966,122 | A | 10/1999 | Itoh | 6,137,468 A | 10/2000 | Martinez |
| 5,969,718 | A | 10/1999 | Mills | 6,137,534 A | 10/2000 | Anderson |
| 5,969,761 | A | 10/1999 | Takahashi et al. | 6,141,044 A | 10/2000 | Anderson |
| 5,973,691 | A | 10/1999 | Servan-Schreiber | 6,144,362 A | 11/2000 | Kawai |
| 5,973,694 | A | 10/1999 | Steele et al. | 6,147,703 A | 11/2000 | Miller |
| 5,973,734 | A | 10/1999 | Anderson | 6,147,709 A | 11/2000 | Martin et al. |
| 5,974,386 | A | 10/1999 | Ejima et al. | 6,157,394 A | 12/2000 | Anderson |
| 5,977,975 | A | 11/1999 | Mugura et al. | 6,161,131 A | 12/2000 | Garfinkle |
| 5,977,976 | A | 11/1999 | Maeda | 6,167,469 A | 12/2000 | Safai |
| 5,977,985 | A | 11/1999 | Ishii | 6,169,575 B1 | 1/2001 | Anderson |
| 5,978,016 | A | 11/1999 | Lourette et al. | 6,169,725 B1 | 1/2001 | Gibbs et al. |
| 5,978,020 | A | 11/1999 | Watanabe et al. | 6,175,663 B1 | 1/2001 | Huang |
| 5,978,607 | A | 11/1999 | Teremy | 6,177,956 B1 | 1/2001 | Anderson et al. |
| 5,982,350 | A | 11/1999 | Hekmatpour et al. | 6,177,957 B1 | 1/2001 | Anderson |
| 5,982,429 | A | 11/1999 | Kamamoto et al. | 6,188,431 B1 | 2/2001 | Oie |
| 5,983,297 | A | 11/1999 | Noble et al. | 6,188,432 B1 | 2/2001 | Ejima |
| 5,986,701 | A | 11/1999 | Anderson | 6,188,782 B1 | 2/2001 | Le Beux |
| 5,987,223 | A | 11/1999 | Narukawa et al. | 6,204,877 B1 | 3/2001 | Kiyokawa |
| 5,991,465 | A | 11/1999 | Anderson | 6,205,485 B1 | 3/2001 | Kikinis |
| 5,991,515 | A | 11/1999 | Fall et al. | 6,209,048 B1 | 3/2001 | Wolff |
| 5,993,137 | A | 11/1999 | Harr | 6,211,870 B1 | 4/2001 | Foster |
| 5,999,173 | A | 12/1999 | Ubillos | 6,215,523 B1 | 4/2001 | Anderson |
| 5,999,191 | A | 12/1999 | Frank et al. | 6,222,538 B1 | 4/2001 | Anderson |
| 5,999,207 | A | 12/1999 | Rodriguez et al. | 6,223,190 B1 | 4/2001 | Aihara et al. |
| 5,999,740 | A | 12/1999 | Rowley | 6,226,449 B1 | 5/2001 | Inoue et al. |
| 6,003,093 | A | 12/1999 | Kester | 6,229,566 B1 | 5/2001 | Matsumoto et al. |
| 6,005,613 | A | 12/1999 | Endsley et al. | 6,230,307 B1 | 5/2001 | Davis et al. |
| 6,005,618 | A | 12/1999 | Fukui | 6,233,015 B1 | 5/2001 | Miller |
| 6,006,039 | A | 12/1999 | Steinberg et al. | 6,237,010 B1 | 5/2001 | Hui et al. |
| 6,009,336 | A | 12/1999 | Harris et al. | 6,239,794 B1 | 5/2001 | Yuen et al. |
| 6,011,585 | A | 1/2000 | Anderson | 6,239,837 B1 | 5/2001 | Yamada et al. |
| 6,011,926 | A | 1/2000 | Cockell | 6,246,430 B1 | 6/2001 | Peters |
| 6,012,088 | A | 1/2000 | Li et al. | 6,249,316 B1 | 6/2001 | Anderson |
| 6,015,093 | A | 1/2000 | Barrett | 6,256,063 B1 | 7/2001 | Saito et al. |
| 6,020,920 | A | 2/2000 | Anderson | 6,262,769 B1 | 7/2001 | Anderson |
| 6,020,982 | A | 2/2000 | Yamauchi et al. | 6,275,260 B1 | 8/2001 | Anderson |
| 6,022,315 | A | 2/2000 | Iliff | 6,278,447 B1 | 8/2001 | Anderson |
| 6,023,241 | A | 2/2000 | Clapper | 6,285,398 B1 | 9/2001 | Shinsky et al. |
| 6,023,697 | A | 2/2000 | Bates et al. | 6,292,218 B1 | 9/2001 | Parulski et al. |
| 6,025,827 | A | 2/2000 | Bullock et al. | RE37,431 E | 10/2001 | Lanier et al. |
| 6,028,603 | A | 2/2000 | Wang et al. | 6,300,950 B1 | 10/2001 | Clark et al. |
| 6,028,611 | A | 2/2000 | Anderson et al. | 6,304,851 B1 | 10/2001 | Kmack et al. |
| 6,031,964 | A | 2/2000 | Anderson | 6,307,544 B1 | 10/2001 | Harding |
| 6,035,323 | A | 3/2000 | Narayen et al. | 6,310,647 B1 | 10/2001 | Parulski et al. |
| 6,035,359 | A | 3/2000 | Enoki | 6,310,648 B1 | 10/2001 | Miller et al. |
| 6,037,972 | A | 3/2000 | Horiuchi et al. | 6,317,141 B1 | 11/2001 | Pavley |
| 6,038,545 | A | 3/2000 | Mandeberg et al. | 6,334,025 B1 | 12/2001 | Yamagami |
| 6,052,555 | A | 4/2000 | Ferguson | 6,353,848 B1 | 3/2002 | Morris |
| 6,052,692 | A | 4/2000 | Anderson | 6,356,281 B1 | 3/2002 | Isenman |
| 6,058,428 | A | 5/2000 | Wang et al. | 6,356,357 B1 | 3/2002 | Anderson |
| 6,072,479 | A | 6/2000 | Ogawa | 6,380,972 B1 | 4/2002 | Suga et al. |
| 6,072,480 | A | 6/2000 | Gorbet et al. | 6,400,375 B1 | 6/2002 | Okudaira |
| 6,072,489 | A | 6/2000 | Gough et al. | 6,400,471 B1 | 6/2002 | Kuo et al. |
| 6,075,905 | A | 6/2000 | Herman et al. | 6,426,771 B1 | 7/2002 | Kosugi |
| 6,078,005 | A | 6/2000 | Kurakake | 6,437,829 B1 | 8/2002 | Webb |
| 6,078,756 | A | 6/2000 | Squilla et al. | 6,441,854 B2 | 8/2002 | Fellegara et al. |
| 6,082,827 | A | 7/2000 | McFall | 6,441,927 B1 | 8/2002 | Dow et al. |
| 6,084,990 | A | 7/2000 | Suzuki et al. | 6,445,412 B1 | 9/2002 | Shiohara |
| 6,091,846 | A | 7/2000 | Lin et al. | 6,473,123 B1 | 10/2002 | Anderson |
| 6,091,956 | A | 7/2000 | Hollenberg | 6,483,602 B1 | 11/2002 | Haneda |
| 6,094,221 | A | 7/2000 | Andersion | 6,486,914 B1 | 11/2002 | Anderson |
| 6,097,389 | A | 8/2000 | Morris et al. | 6,493,028 B1 | 12/2002 | Anderson |
| 6,097,430 | A | 8/2000 | Komiya et al. | 6,504,575 B1 | 1/2003 | Ramirez et al. |
| 6,097,431 | A | 8/2000 | Anderson | 6,507,362 B1 | 1/2003 | Akerib |

| | | | |
|---|---|---|---|
| 6,512,548 B1 | 1/2003 | Anderson | |
| 6,515,704 B1 | 2/2003 | Sato | |
| 6,532,039 B2 | 3/2003 | Anderson | |
| 6,536,357 B1 | 3/2003 | Hiestand | |
| 6,538,698 B1 | 3/2003 | Anderson | |
| 6,563,535 B1 | 5/2003 | Anderson | |
| 6,563,542 B1 | 5/2003 | Hatakenaka et al. | |
| 6,567,122 B1 | 5/2003 | Anderson et al. | |
| 6,571,271 B1 | 5/2003 | Savitzky et al. | |
| 6,682,207 B2 | 1/2004 | Weber et al. | |
| 6,683,649 B1 | 1/2004 | Anderson | |
| 6,738,075 B1 | 5/2004 | Torres et al. | |
| 6,747,692 B2 | 6/2004 | Patel et al. | |
| 6,765,612 B1 | 7/2004 | Anderson et al. | |
| 6,779,153 B1 | 8/2004 | Kagle | |
| 6,803,945 B1 | 10/2004 | Needham | |
| 6,806,906 B1 | 10/2004 | Soga et al. | |
| 6,897,891 B2 | 5/2005 | Itsukaichi | |
| 6,965,400 B1 | 11/2005 | Haba et al. | |
| 7,050,143 B1 | 5/2006 | Silverbrook | |
| 7,215,371 B2 | 5/2007 | Fellegara et al. | |
| 7,337,403 B2 | 2/2008 | Pavley | |
| 2001/0010543 A1 | 8/2001 | Ward et al. | |
| 2001/0012062 A1 | 8/2001 | Anderson | |
| 2001/0014910 A1 | 8/2001 | Bobo | |
| 2001/0014968 A1 | 8/2001 | Mohammed | |
| 2001/0049758 A1 | 12/2001 | Shigetomi et al. | |
| 2001/0050711 A1 | 12/2001 | Karube et al. | |
| 2002/0105582 A1 | 8/2002 | Ikeda | |
| 2002/0109782 A1 | 8/2002 | Ejima | |
| 2003/0169350 A1 | 9/2003 | Wiezel | |
| 2006/0174326 A1 | 8/2006 | Ginter et al. | |
| 2006/0200260 A1 | 9/2006 | Hoffberg | |
| 2007/0061594 A1 | 3/2007 | Ginter et al. | |

FOREIGN PATENT DOCUMENTS

| | | | |
|---|---|---|---|
| EP | 0661658 A2 | 7/1995 | |
| EP | 0664475 A1 | 7/1995 | |
| EP | 0664526 A2 | 7/1995 | |
| EP | 0664527 A1 | 7/1995 | |
| EP | 0729271 A2 | 8/1996 | |
| EP | 0449106 B1 | 12/1996 | |
| EP | 0817476 A2 | 1/1998 | |
| EP | 0821522 A2 | 1/1998 | |
| EP | 0835011 A1 | 4/1998 | |
| EP | 0860735 A2 | 8/1998 | |
| EP | 0860982 A2 | 8/1998 | |
| EP | 0890919 A1 | 1/1999 | |
| GB | 2245749 A1 | 1/1992 | |
| GB | 2289555 A | 11/1995 | |
| JP | 55-142470 A | 11/1980 | |
| JP | 55-142471 A | 11/1980 | |
| JP | 62-271178 A | 11/1987 | |
| JP | 1-132173 A | 5/1988 | |
| JP | 1-238382 A | 9/1989 | |
| JP | 1-319870 A | 12/1989 | |
| JP | 2-42489 A | 2/1990 | |
| JP | 2-162420 A | 6/1990 | |
| JP | 2-257262 A | 10/1990 | |
| JP | 2-280484 A | 11/1990 | |
| JP | 3-117181 A | 5/1991 | |
| JP | 3-231574 A | 10/1991 | |
| JP | 3-246766 A | 11/1991 | |
| JP | 3-506111 A | 12/1991 | |
| JP | 4-115788 A | 4/1992 | |
| JP | 4-120889 A | 4/1992 | |
| JP | 4-230517 A | 8/1992 | |
| JP | 4-302886 A | 10/1992 | |
| JP | 4-506144 A | 10/1992 | |
| JP | 4-372070 A | 12/1992 | |
| JP | 5-14847 A | 1/1993 | |
| JP | 5-91452 A | 4/1993 | |
| JP | 5-108785 A | 4/1993 | |
| JP | 5-115027 A | 5/1993 | |
| JP | 5-131779 A | 5/1993 | |
| JP | 5-150308 A | 6/1993 | |
| JP | 5-207343 A | 8/1993 | |
| JP | 5-260351 A | 10/1993 | |
| JP | 5-289838 A | 11/1993 | |
| JP | 5-290143 A | 11/1993 | |
| JP | 5-308617 A | 11/1993 | |
| JP | 5-314093 A | 11/1993 | |
| JP | 6-57612 A | 3/1994 | |
| JP | 6-60078 A | 3/1994 | |
| JP | 6-78260 A | 3/1994 | |
| JP | 6-103352 A | 4/1994 | |
| JP | 6-105266 A | 4/1994 | |
| JP | 6-178261 A | 6/1994 | |
| JP | 6-197299 A | 7/1994 | |
| JP | 6-265794 A | 9/1994 | |
| JP | 6-290103 A | 10/1994 | |
| JP | 6-348467 A | 12/1994 | |
| JP | 6-350949 A | 12/1994 | |
| JP | 7-6028 A | 1/1995 | |
| JP | 7-160842 A | 6/1995 | |
| JP | 7-168852 A | 7/1995 | |
| JP | 7-184160 | 7/1995 | |
| JP | 7-184160 A | 7/1995 | |
| JP | 7-221911 A | 8/1995 | |
| JP | 7-245723 A | 9/1995 | |
| JP | 7-274060 A | 10/1995 | |
| JP | 7-274108 A | 10/1995 | |
| JP | 7-295873 A | 11/1995 | |
| JP | 8-32847 A | 2/1996 | |
| JP | 8-502840 A | 3/1996 | |
| JP | 8-111845 A | 4/1996 | |
| JP | 8-114849 A | 5/1996 | |
| JP | 8-116476 A | 5/1996 | |
| JP | 8-140025 A | 5/1996 | |
| JP | 8-147952 A | 6/1996 | |
| JP | 8-147952 | 6/1996 | |
| JP | 8-205014 A | 8/1996 | |
| JP | 8-223524 A | 8/1996 | |
| JP | 8-249450 A | 9/1996 | |
| JP | 8-279034 A | 10/1996 | |
| JP | 8-331495 A | 12/1996 | |
| JP | 8-339297 A | 12/1996 | |
| JP | 9-27939 A | 1/1997 | |
| JP | 9-37139 A | 2/1997 | |
| JP | 9-163275 A | 6/1997 | |
| JP | 9-171213 A | 6/1997 | |
| JP | 9-311850 A | 12/1997 | |
| JP | 10-4535 A | 1/1998 | |
| JP | 10-162020 A | 6/1998 | |
| JP | 10-243331 A | 9/1998 | |
| JP | 2000-92439 A | 3/2000 | |
| JP | 2000-510616 A | 8/2000 | |
| JP | 2000-287110 A | 10/2000 | |
| JP | 2001-501416 A | 1/2001 | |
| WO | WO-91/14334 A1 | 9/1991 | |
| WO | WO-92/05652 A2 | 4/1992 | |
| WO | WO-92/05655 A1 | 4/1992 | |
| WO | WO-92/09169 A1 | 5/1992 | |
| WO | WO-92/20186 A1 | 11/1992 | |
| WO | WO-94/23375 A1 | 10/1994 | |
| WO | WO-95/32583 A1 | 11/1995 | |
| WO | WO-96/02106 A1 | 1/1996 | |
| WO | WO-96/29818 A1 | 9/1996 | |
| WO | WO-97/17669 A1 | 5/1997 | |
| WO | WO-97/38510 A1 | 10/1997 | |
| WO | WO-98/14887 A1 | 4/1998 | |

OTHER PUBLICATIONS

*Sony Digital Still Camera DSC–F1 Operating Instructions,* pp. 1–6, 16–17, 22–25, and 57–58, published 1996.

"Laboratory Analysis—Data Link: The Future of Camera Technology," *Popular Photography,* Sep. 1993, p. 48.

"PCMCIA for PowerBook 500 Series Computers," *Apple-Facts Online,* 1994, >http://product.info.apple.com/product-info/factsheets/pcmcia.html>.

"YCC Color Space," Oct. 3, 2000, <http://www.aols.com/colorite/yccspace.html>.

"MM4850: Image: Representation," Nov. 4, 1996, <http://www.mcs.csueastbay.edu/~tebo/Classes/4850/Image/representation.html>.

"What Isn't Obvious in the Patent World," Patnews, Jan. 30, 1998, email correspondence.

*Laura Lemay's Guide to Sizzling Web Site Design,* Sans.net Publishing, Indianapolis, 1997, pp. 75–77.

"Digitella Technology Solutions Announces ScriptGenerator 1.0, Enabling Users to Easily Develop Software Scripts that Run on Digital Cameras," *PR Newswire,* Oct. 7, 1998.

Grimm, Leigh, "The Manipulation Proclamation," *Photo Trade News,* Feb. 1997, p. 66.

"Kodak DC3400 Zoom—Distinctive New Kodak DC3400 Zoom Digital Camera Offers Easy–to–Use Features, Stylish New Look, All at Affordable Price," *Kodak Press Release,* Aug. 1, 2000.

Hauf et al., "The FlashPix™ Image File Format," *The Fourth Color Imaging Conference: Color Science, Systems and Applications,* 1996, pp. 234–238.

Watanabe et al., "An Image Data File Format for Digital Still Camera," *IS&T's 48th Annual Conference Proceedings,* May 1995, vol. 48, pp. 421–424.

"Disk Drive with Embedded Hyper–Text Markup Language Server," *IBM Technical Disclosure Bulletin,* vol. 38, No. 12, Dec. 1995, p. 479.

"Phaser® 740L Color–Capable Laser Printer," printed Apr. 15, 1999, <http://www.tek.com/Color_Printers/products/740L/740Lfe.htm>.

"What is PhaserLink Software?," printed Apr. 15, 1999, <http://www.tek.com/Color_Printers/userdoc/PShare3/phlink1.htm>.

Corcoran et al., "A Portable Java API Interface to Simplify User Access to Digital Cameras," *IEEE Transactions on Consumer Electronics,* vol. 44, No. 3, Aug. 1998, pp. 686–691.

Mann, Steve, "Headmounted Wireless Video: Computer–Supported Collaboration for Photojournalism and Everyday Use," *IEEE Communications Magazine,* vol. 36, No. 6, Jun. 1998, pp. 144–151.

Williams, Martyn, "Review—NEC PC–DC401 Digital Still Camera," *AppleLink Newbytes,* Mar. 15, 1996.

Peisel, Bill, "Designing the Next Step in Internet Appliances," *Electronic Design,* Mar. 23, 1998, pp. 50, 52, and 56.

Steinfield, Edward, "Leveraging Browsers as Universal GUIs," *EE Times,* Issue 932, Dec. 16, 1996, 4 pages.

Newby, Kris, "Apple's New Image–Capture Platform," *Apple Directions,* Aug. 1996.

"Device Drivers via the Access Bus," *IBM Technical Disclosure Bulletin,* vol. 39, No. 1, Jan. 1996, pp. 135–136.

Degann et al., "Still Images Retrieval from a Remote Database: The System *Imagine,"* Signal Processing: Image Communication,* vol. 5, No. 3, May 1993, pp. 219–234.

"Getting Started With Your Macintosh LC III," cover and inside cover page, p. 21, 1992.

"User's Guide Microsoft Windows & MS–DOS 6," Microsoft Corporation, pp. iii and 71–75, 1993.

Ide, K, "Color Zaurus," Soft Bank KK, Japan, Aug. 15, 1996, pp. 1–111.

Kodak Professional Digital Camera System (DSC100) User's Manual, Eastman Kodak Company, 1991–1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix Digital Card Camera DS–220 brochure, Fuji Photo Film Co., Ltd., 1995.

Epson PhotoPC 500 Color Digital Camera brochure, Seiko Epson Corporation, Oct. 3, 1995.

Okachi et al., "Clear! Simple! Upgraded Digital Photography," *Nikkei Personal Computing,* Nikkei Business Publications, Inc., Japan, Aug. 26, 1996, vol. 271, pp. 236–264.

Kurzidim, "Bildersafari: Foto–Und Videodatenbanken von 100 bis 100000 OM", vol. 9, 1994, pp. 112–114, 116–117, 120–121.

Aker et al., *The Macintosh Bible,* Third Edition, Nov. 1991, pp. 63–64, 324, 931, 945, Goldstein & Blair, Berkeley, California.

*Liquid Crystal Digital Camera QV–10B Owner's Manual,* Casio, 1995, pp. 1–89, Casio Computer Co., Ltd.

Foley et al., *Introduction to Computer Graphics,* 1994, 1990, pp. 505–509, Addison–Wesley Publishing Company, Inc.

Foley et al., *Computer Graphics—Principles and Practice, Second Edition,* Jun. 15, 1990, pp. 745–759, Addison–Wesley Publication Company, Inc.

*Inside Macintosh,* Apple Computer, 1993, pp. 1–5 to 1–8 and 4–1 to 4–46, Apple Computer Inc., Cupertino, California.

Kroiak et al., "A Declaration of Device Independence," *ESD: The Electronic System Design Magazine,* May 1988, pp. 63–65, vol. 18, No. 5.

Melville et al., "An Application Programmer's Interface for Digital Cameras," Imaging Science and Technology's $49^{th}$ Annual Conference, May 19–24, 1996, The Society for Imaging Science and Technology.

*Picona PC–DC200 PC–DC200K User's Manual,* Feb. 1997, NEC Corporation.

Posnak et al., "An Adaptive Framework for Developing Multimedia Software Components," *Communications of the ACM,* Oct. 1997, pp. 43–47, vol. 40, No. 10, ACM.

*Ricoh Digital Camera RDC–1 Instruction Manual,* Ricoh, Ricoh Americas Corp., Ricoh Co., Ltd Japan.

Shimizu et al., "The Digital Camera Using New Compression and Interpolation Algorithm," IS&T $49^{th}$ Annual Conference, May 19–24, 1996, pp. 268–272, IS&T, Springfield, Virginia.

Skelton et al., "Design and Development of a Transportable Image Processing and GIS System," *Infrared Image Processing and Enhancement,* May 20–21, 1987, pp. 187–191, vol. 781, SPIE, Bellingham, Washington.

*Texas Instruments TI–85 Guidebook,* 1993, Texas Instruments Incorporated.

*Texas Instruments TI–85 Guidebook,* 1995, Texas Instruments Incorporated.

*VxWorks Programmer's Guide,* 1984–1999, Wind River Systems, Inc.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7 and 13 are determined to be patentable as amended.

Claims 2-6 and 8-12, dependent on an amended claim, are determined to be patentable.

New claims 14-34 are added and determined to be patentable.

1. A method for displaying a series of images captured by a digital camera, the digital camera including a user interface that includes a view finder, the method comprising the steps of:
   (a) storing each one of the captured images, each one of the captured images having one or more media types associated therewith, wherein the media types include a still image, a burst image, a time lapse image, a panorama image, a movie clip, and sound;
   (b) displaying a plurality of image cells in the view finder, wherein each of the image cells corresponds to one of the captured images;
   (c) providing at least one of the image cells with an image area for displaying the corresponding captured image;
   (d) providing the at least one image cell with an icon area adjacent to the image area for displaying additional information regarding the corresponding captured image; and
   (e) displaying graphical icons in the icon area indicating the media types associated with the captured image,
   *wherein the step of displaying graphical icons in the icon area comprises displaying a graphical icon that indicates an image type for the captured image.*

7. A system for displaying a series of images captured by a digital camera, the digital camera including a user interface that includes a view finder, the system comprising:
   means for storing each one of the captured images, each one of the captured images having one or more media types associated therewith, wherein the media types include a still image, a burst image, a time lapse image, a panorama image, a movie clip, and sound;
   means for displaying a plurality of image cells in the view finder, each of the image cells corresponding to one of the captured images, wherein at least one of the image cells includes an image area for displaying the corresponding captured image, and an icon area adjacent to the image area for displaying information regarding the corresponding captured image; and
   means for displaying graphical icons in the icon area indicating the media types associated with captured image,
   *wherein the means for displaying graphical icons is configured to display a graphical icon that indicates an image type for the captured image.*

13. A digital camera device comprising:
   a memory device coupled to the digital camera device for storing sets of image data, each set of the image data having one or more media types associated therewith, wherein the media types include a still image, a burst image, a time lapse image, a panorama image, a movie [lip] *clip*, and sound;
   a memory manager for allocating storage locations within the memory device to store the sets of image data, the image data stored in a file format includes the image data, a thumb nail image of the image data, and an information field for storing information regarding the image data, including the associated media types; and
   an interface coupled to the memory device for displaying a plurality of image cells corresponding to the image data, wherein at least one of the image cells includes an image area for displaying the thumb nail image of the corresponding image data, and an icon area adjacent to the image area for displaying additional information regarding the corresponding image data, including graphical icons indicating the media types associated with the captured image,
   *wherein the captured image is a movie clip, and a movie clip icon is displayed in the icon area adjacent to the image area to indicate that the captured image is a movie clip.*

14. *The method of claim 1 wherein the captured image is a panoramic image and the graphical icon indicates the captured image is the panoramic image.*

15. *The method of claim 1 wherein the captured image is a still image and the graphical icon indicates the captured image is the still image.*

16. *The method of claim 1 wherein the captured image is a movie clip and the graphical icon indicates the captured image is the movie clip.*

17. *The method of claim 1 wherein the corresponding captured image is displayed in the image area in the form of a thumbnail image of one of the captured images.*

18. *A method for displaying a series of images captured by a digital camera, the digital camera including a user interface that includes a view finder, the method comprising the steps of:*
   *(a) storing each one of the captured images, each one of the captured images having one or more media types associated therewith, wherein the media types include a still image, a burst image, a time lapse image, a panorama image, a movie clip, and sound;*
   *(b) displaying a plurality of image cells in the view finder, wherein each of the image cells corresponds to one of the captured images;*
   *(c) providing at least one of the image cells with an image area for displaying the corresponding captured image;*
   *(d) providing the at least one image cell with an icon area adjacent to the image area for displaying additional information regarding the corresponding captured image; and*
   *(e) displaying graphical icons in the icon area indicating the media types associated with the captured image,*
   *wherein the captured image is a movie clip and the step of displaying graphical icons in the icon area comprises displaying a graphical movie clip icon in the icon area to indicate the captured image is the movie clip.*

19. *The method of claim 18 wherein the corresponding captured image is displayed in the image area in the form of a thumbnail image of one of the captured images.*

20. The system of claim 7 wherein the captured image is a panoramic image and the graphical icon indicates the captured image is the panoramic image.

21. The system of claim 7 wherein the captured image is a still image and the graphical icon indicates the captured image is a still image.

22. The system of claim 7 wherein the captured image is a movie clip and the graphical icon indicates the captured image is a movie clip image.

23. The system of claim 7 wherein the corresponding captured image is displayed in the image area in the form of a thumbnail image of one of the captured images.

24. A system for displaying a series of images captured by a digital camera, the digital camera including a user interface that includes a view finder, the system comprising:
   means for storing each one of the captured images, each one of the captured images having one or more media types associated therewith, wherein the media types include a still image, a burst image, a time lapse image, a panorama image, a movie clip, and sound;
   means for displaying a plurality of image cells in the view finder, each of the image cells corresponding to one of the captured images, wherein at least one of the image cells includes an image area for displaying the corresponding captured image, and an icon area adjacent to the image area for displaying additional information regarding the corresponding other captured image; and
   means for displaying graphical icons in the icon area indicating the media types associated with the captured image,
   wherein the captured image is a movie clip and the means for displaying graphical icons in the icon area is configured to display a graphical movie clip icon in the icon area to indicate the captured image is the movie clip.

25. The system of claim 24 wherein the corresponding captured image is displayed in the image area in the form of a thumbnail image of one of the captured images.

26. A method for displaying a series of images captured by a digital camera, the digital camera including a user interface that includes a view finder, the method comprising the steps of:
   (a) storing each one of the captured images, each one of the captured images having one or more media types associated therewith, wherein the media types include a still image and a movie clip;
   (b) displaying a plurality of image cells in the view finder, wherein:
      each of the plurality of image cells correspond to one of the captured images, first image cells of the plurality of image cells correspond to certain ones of the captured images that are still images, and
      at least one of the image cells corresponds to a series of the captured images that represent a movie clip;
   (c) providing the at least one of the image cells with a first image area for displaying a thumbnail of an image of the series of captured images that represents the movie clip and providing the first image cells with image areas for displaying corresponding thumbnails of the certain of the captured images that are still images;
   (d) providing the at least one of the image cells with an icon area adjacent to the first image area for displaying additional information regarding the series of captured images that represent the movie clip; and
   (e) displaying a graphical movie clip icon in the icon area indicating the media type associated with the series of captured images that represent the movie clip is the movie clip.

27. The method of claim 26 wherein storing each one of the captured images further comprises storing each of the certain of the captured images that are still images in a file format that comprises compressed image data that represents a corresponding one of the captured images in compressed form and a thumbnail image data that represents a small version of the image.

28. The method of claim 27 wherein the file format further comprises information indicating the corresponding one of the captured images is a still image.

29. The method of claim 26 wherein at least one image of the certain ones of the captured images that are still images is associated with a sound clip, and a corresponding one of the first image cells is provided with an icon area in which a graphical sound clip icon is displayed.

30. The method of claim 26 wherein at least one image of the captured images is associated with text, and a corresponding one of the plurality of image cells is provided with an icon area in which the text is displayed.

31. A method for displaying a series of images captured by a digital camera, the digital camera including a user interface that includes a view finder, the method comprising the steps of:
   (a) storing each one of the captured images, each one of the captured images corresponding to a series of the captured images that represent a movie clip and having a movie clip media type associated therewith;
   (b) displaying a plurality of image cells in the view finder, wherein each of the plurality of image cells corresponds to one of the captured images;
   (c) providing each of the image cells with an image area for displaying a corresponding thumbnail of an image of the series of captured images that represents the movie clip;
   (d) providing each of the image cells with an icon area adjacent to the image area for displaying additional information regarding the series of captured images that represent the movie clip; and
   (e) displaying a graphical movie clip icon in each icon area indicating the media type associated with the series of captured images that represent the movie clip is the movie clip.

32. A digital camera for displaying a series of images comprising a computer and an associated user interface with a view finder, the computer configured to:
   (a) store each one of the captured images, each one of the captured images having one or more media types associated therewith, wherein the media types include a still image and a movie clip;
   (b) display a plurality of image cells in the view finder, wherein:
      each of the plurality of image cells corresponds to one of the captured images, first image cells of the plurality of image cells correspond to certain ones of the captured images that are still images, and
      at least one of the image cells corresponds to a series of the captured images that represent a movie clip;
   (c) provide the at least one of the image cells with a first image area for displaying a thumbnail of an image of the series of captured images that represents the movie clip and providing the first image cells with image areas for displaying corresponding thumbnails of the certain of the captured images that are still images;
   (d) provide the at least one of the image cells with an icon area adjacent to the first image area for displaying additional information regarding the series of captured images that represent the movie clip; and (e) displaying a graphical movie clip icon in the icon area indicating the media type associated with the series of captured images that represent the movie clip is a movie clip.

33. *A digital camera for displaying a series of images comprising a computer and an associated user interface with a view finder, the computer configured to:*
   (a) *store each one of the captured images, each one of the captured images corresponding to a series of the captured images that represent a movie clip and having a movie clip media type associated therewith;*
   (b) *display a plurality of image cells in the view finder, wherein each of the plurality of image cells corresponds to one of the captured images;*
   (c) *provide each of the image cells with an image area for displaying a corresponding thumbnail of an image of the series of captured images that represents the movie clip;*
   (d) *provide each of the image cells with an icon area adjacent to the image area for displaying additional information regarding the series of captured images that represent the movie clip; and*
   (e) *display a graphical movie clip icon in each icon area indicating the media type associated with the series of captured images that represent the movie clip is the movie clip.*

34. *A method for displaying a series of images captured by a digital camera, the digital camera including a user interface that includes a view finder, the method comprising the steps of:*
   (a) *storing each one of the captured images, each one of the captured images having one or more media types associated therewith, wherein the media types include a still image and a movie clip;*
   (b) *displaying a plurality of image cells in the view finder, wherein:*
      *each of the plurality of image cells corresponds to one of the captured images, a first image cell of the plurality of image cells corresponds to a captured image that is a still image, and*
      *a second image cell of the plurality of image cells corresponds to a series of captured images that represent a movie clip;*
   (c) *providing the first image cell with a first image area for displaying a corresponding thumbnail of the still image, and providing the second image cell with a second image area for displaying a thumbnail of an image of the series of captured images that represent a movie clip;*
   (d) *providing the second image cell with an icon area adjacent to the second image area for displaying additional information regarding the series of captured images that represent the movie clip; and*
   (e) *displaying a graphical movie clip icon in the icon area indicating the media type associated with the series of captured images that represent the movie clip is the movie clip.*

\* \* \* \* \*